United States Patent [19]
Bricklin et al.

[11] Patent Number: 5,867,150
[45] Date of Patent: Feb. 2, 1999

[54] GRAPHIC INDEXING SYSTEM

[75] Inventors: Daniel Bricklin, Newton Highland; Eric E. Johnson, Brighton, both of Mass.; John L. Friend, Pleasanton, Calif.; Winslow B. Kelley, Natick; Peter H. Levin, Cambridge, both of Mass.

[73] Assignee: Compaq Computer Corporation, Houston, Tex.

[21] Appl. No.: 474,373

[22] Filed: Jun. 7, 1995

Related U.S. Application Data

[62] Division of Ser. No. 187,803, Jan. 27, 1994, Pat. No. 5,539,427, which is a continuation of Ser. No. 833,859, Feb. 10, 1992, abandoned.

[51] Int. Cl.⁶ .................................................. G09G 5/00
[52] U.S. Cl. ............................................ 345/173; 345/358
[58] Field of Search .................................. 345/118, 120, 345/173, 112; 382/313, 314; 178/18, 19; 395/358

[56] References Cited

U.S. PATENT DOCUMENTS

| | | | |
|---|---|---|---|
| 4,553,206 | 11/1985 | Smutek et al. | 395/275 |
| 4,559,533 | 12/1985 | Bass et al. | 345/120 |
| 4,649,380 | 3/1987 | Penna | 345/127 |
| 4,785,296 | 11/1988 | Tabata et al. | 345/129 |
| 4,808,987 | 2/1989 | Takeda | 345/115 |
| 4,879,648 | 11/1989 | Cochran et al. | 395/275 |
| 4,881,180 | 11/1989 | Nishiyama | 395/110 |
| 5,157,737 | 10/1992 | Sklarew | 382/315 |
| 5,231,698 | 7/1993 | Forcier | 395/358 |
| 5,252,951 | 10/1993 | Tannenbaum et al. | 345/173 |
| 5,539,427 | 7/1996 | Bricklin et al. | 345/118 |

OTHER PUBLICATIONS

MacIntosh, "MacPaint", pp. 1–2.

*Primary Examiner*—Xiao Wu
*Attorney, Agent, or Firm*—Fish & Neave; Jeffrey H. Ingerman; Matthew T. Byrne

[57] ABSTRACT

A method and apparatus for selecting and indexing stored information for subsequent retrieval. The indexing system of the present invention indexes pages by storing a reference to a graphic segment of the displayed original page (instead of a copy of the graphic segment) as an index entry. Retrieval of the original page or image is accomplished by choosing from a listing of several categories of indexes, and then selecting an index entry displayed in the index gallery. The present invention provides a selection method using a lasso-tap gesture that allows the user to select a portion of the text for indexing (or other operations) without disrupting the natural handwriting action. Selection is accomplished using a closed (or nearly closed) curve followed by a recognized gesture within the closed curve. A local minimum established by the end points of the closed curve must fall within a specified range to identify the closed curve as a selection lasso. In one embodiment, recognized gestures for selection, enlargement, deletion and indexing are supported. Different segments from the same page or image may be compiled in the same index, or in different indexes. Indexing segments may be selected from any displayed page in the file, including spreadsheet pages or word processor pages, in addition to calendar pages and blank notebook pages.

39 Claims, 15 Drawing Sheets

FIG. 1

AUGUST 1995

| | 1 | 2 | 3 | 4 | 5 | |
|---|---|---|---|---|---|---|
| 6 | 7 | 8 | 9 | 10 | 11 | 12 |
| 13 | 14 | 15 Lunch 1:00 Joe Brown 555-1234 | 16 | 17 | 18 | 19 |
| 20 | 21 | 22 Al's Cafe 555-3800 | 23 | 24 | 25 | 26 |
| 27 | 28 | 29 | 30 | 31 | | |

11/4 3:00 PM
Finance Meeting
Agenda: — Taxes
— Budget

Jane Olsen, CPA
555-2213

AUGUST 1995

| | | | | | | |
|---|---|---|---|---|---|---|
| | 1 | 2 | 3 | 4 | 5 | |
| 6 | 7 | 8 | 9 | 10 | 11 | 12 |
| 13 | 14 | 15 Lunch 1:00 Joe Brown 555-1234 | 16 | 17 | 18 | 19 |
| 20 | 21 | 22 Al's Cafe 555-3800 | 23 | 24 | 25 | 26 |
| 27 | 28 | 29 | 30 | 31 | | |

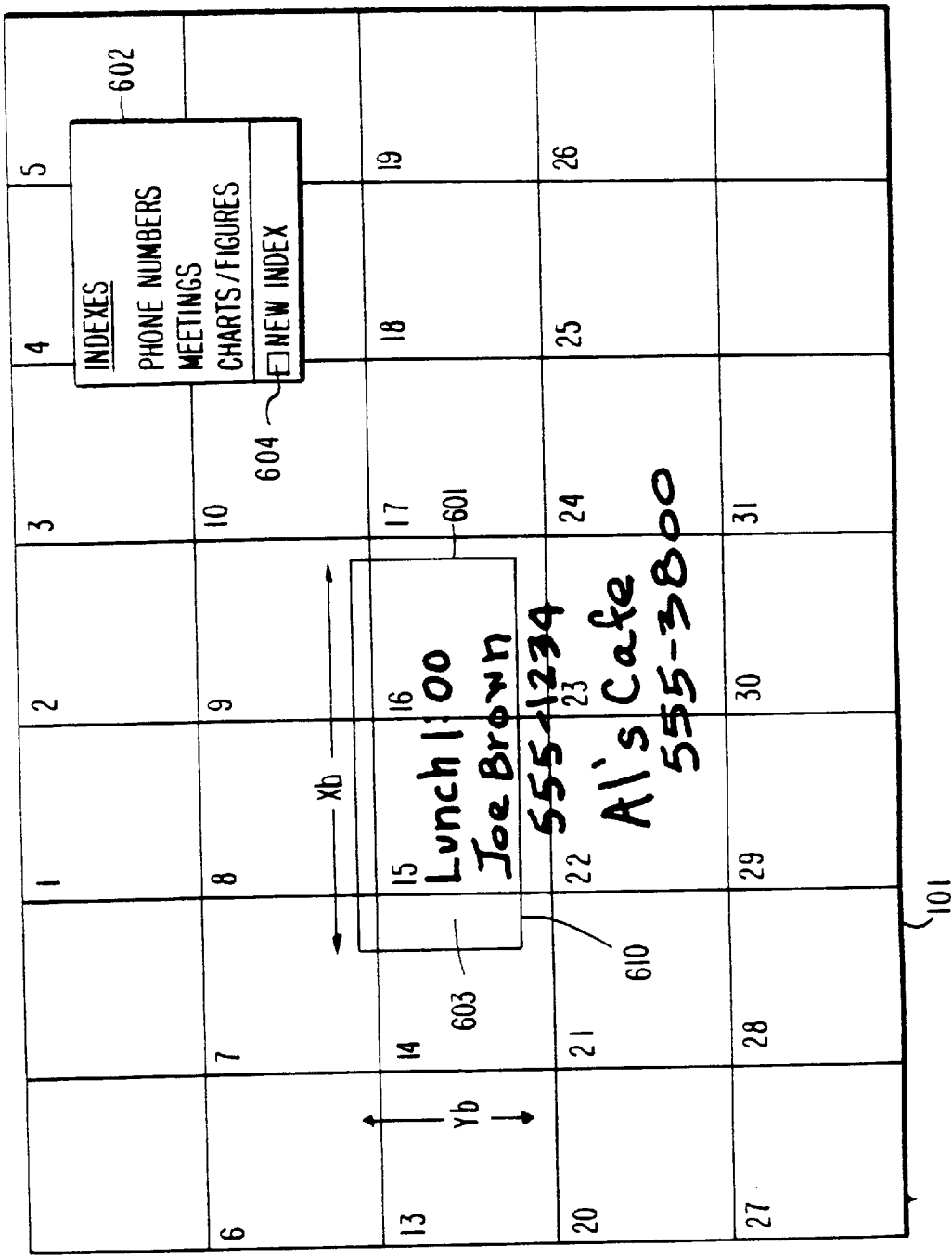

FIG. 7B

INDEX: MEETINGS
ITEM 1 (AUGUST 1995) | ITEM 2 (PAGE 1)
15 | 16
Lunch 1:00
Joe Brown | 11/4 3:00 PM
Meeting

FIG. 7A

INDEX: MEETINGS
ITEM 1 (AUGUST 1995)
15 | 16
Lunch 1:00
Joe Brown

AUGUST 1995

| | | | | | | |
|---|---|---|---|---|---|---|
| | 1 | 2 | 3 | 4 | 5 | 6 |
| | | | | INDEXES<br>PHONE NUMBERS<br>MEETINGS<br>CHARTS/FIGURES<br>☐ NEW INDEX —602 | | |
| 7 | 8 | 9 | 10 | 11 | 12 | 13 |
| 14 | 15 Lunch 1:00 | 16 | 17 | 18 | 19 | 20 |
| 21 | 22 Joe Brown 555-1234 | 23 | 24 —901 | 25 | 26 | 27 |
| 28 | 29 Al's Cafe 555-3800 | 30 | 31 | | | |

AUGUST 1995

| | | | | | | |
|---|---|---|---|---|---|---|
| | 1 | 2 | 3 | 4 | 5 | 6 |
| 7 | 8 | 9 | 10 | | | 13 |
| 14 | 15 Lunch 1:00 Joe Brown 555-1234 | 16 | 17 | 18 | 19 | 20 |
| 21 | 22 Al's Cafe 555-3800 | 23 | 24 | 25 | 26 | 27 |
| 28 | 29 | 30 | 31 | | | |

INDEXES
PHONE NUMBERS
MEETINGS
CHARTS/FIGURES
☐ NEW INDEX — 602

INDEX: PHONE NUMBERS

ITEM 1 (AUGUST 1995)

Joe Brown
555-1234

ITEM 3 (PAGE 1)

Jane Olsen, CPA
555-2213

ITEM 2 (AUGUST 1995)

Al's Cafe
555-3800

GRAPHIC INDEXING SYSTEM

This is a division, of application Ser. No. 08/187,803, filed Jan. 27, 1994, now U.S. Pat. No. 5,539,427, entitled GRAPHIC INDEXING SYSTEM, which is a continuation of Ser. No. 07/833,589filed on Feb. 10, 1992, now abandoned.

BACKGROUND OF THE INVENTION

1. Field of the Invention

The present invention relates to the field of data processing and, more particularly, to pen based methods and apparatus for selecting, indexing and retrieving data.

2. Background Art

Technological advances have produced computer storage systems with the capacity to store large amounts of data. Word processing files, notebook pages, date book pages, calendar pages or graphic images may all be stored in a single computing system. However, once the data is stored, retrieving desired data from such a large amount of stored data can become an intractable problem.

One solution to this data retrieval problem is to give each stored data file a name, and then provide the user with a list of file names from which to choose. This list, or index, is usually ordered in some manner, for example, chronologically or alphabetically, or by file size or type. Unfortunately, this indexing system may have the drawback of having file names that do not completely describe the contents of each file. In large database systems, the number of file names in the index may be so large as to make it difficult for a user to locate a desired file.

A large computer system requires a data file storage and retrieval system that is easy to use and efficient. One way of meeting this requirement is to use reduced images of the original files as index images. In prior art systems, original images are stored along with reduced images thereof. These reduced images (which typically consist of the first page of displayed information) are stored in a separate index file as index images. To retrieve a particular file, a desired image is selected from a display comprised of all of the index images. However, the reduction of the entire original displayed page frequently degrades the image quality of the index images. For example, in a document image containing characters and graphic patterns, the characters cannot be read if the image is reduced to the limit of recognition for the graphic patterns. Conversely, if the the image is reduced to the limit of recognition for the characters, the graphic patterns are not sufficiently reduced, resulting in inefficient data compaction.

A typical computer system consists of a central processing unit (CPU), main memory, such as random access memory (RAM), a data entry device, including a cursor positioning device, a mass storage device, such as one or more disk drives, a and display and/or a printer. In the prior art, the data entry device often consists of a keyboard on which a user enters data by typing. The cursor positioning device of a prior art computer system may be a keypad, "mouse," joystick, or other cursor positioning device.

There are also computer systems that are designed to accept handwritten data entry rather than, or in addition to, keyboard data entry. In a handwritten data entry computer system, the user enters handwritten data directly on the display of the computer system using a pen, stylus, or other writing device. A user may also enter data on a digitizing tablet or other input device, and the written input image is displayed on a separate computer display output device. The writing device for entering handwritten or freestyle stroke input information may be any suitable input device, such as a pen or stylus, mouse, trackball, pointer, or even a person's fingers.

One class of handwriting entry computer system capable of receiving handwritten data input is referred to as "pen based". In a pen based computer system, a user can input information to the computer by "writing" directly on the display. A writing device, such as a pen or stylus, is used to enter information via the display. To input information in a typical pen based computer system, a user touches the stylus to the display and writes as on a piece of paper, that is, by making a series of pen strokes to form letters and words. A line appears on the display that follows the path of travel of the stylus point, so that the pen strokes appear on the display as ink would appear on a handwritten page. Thus, the user enters information into the computer by writing directly on the display. The strokes of writing that appear on the display are referred to here as "ink".

In addition to handwritten letters and words, special functions based on input strokes are supported on pen based computer systems. For example, in one prior art pen based computer system, a writer may delete previously entered handwritten input by making the strokes of an "X" over the unwanted entry. These special functional strokes or actions are referred to here as "gestures".

Pen-based computers can be used with software that creates a computer-based implementation of a paper notebook. A pen-based computer "notebook" program may have a number of standard "pages" on which handwritten notes can be written. For example, the pages may include monthly, daily and weekly calendar pages, an address book and blank note or scratch pages. FIG. 1 illustrates a sample page of data 101. Page 101 is a calendar page for the entire month of August, 1995. Using a hand-held stylus, the user has entered some information concerning a lunch meeting at a particular restaurant. In and around the calendar square for August 15, the user has written "Lunch 1:00," "Joe Brown 555-1234" and "Al's Cafe 555-3800."

FIG. 2 illustrates another page of information 201. Page 201 is a ruled blank note page. Here, the user has jotted down some information concerning a finance meeting including the date, an agenda, a name and a phone number. Specifically, the user has written "11/4 3:00 PM," "Finance Meeting," "Agenda:" followed by "—Taxes" and "—Budget." At the bottom of the page, the user has written "Jane Olsen, CPA 555-2213."

One prior art indexing system is described in U.S. Pat. No. 4,808,987 issued Feb. 28, 1989, entitled "Image Data File Storage and Retrieval System for an Image Data Filing System." (Takeda, et al.). In Takeda, partial areas of an image are enlarged and/or reduced at independent magnification for each partial area, and are combined to prepare an index image which is stored. A desired image is retrieved based on a list of the index images.

In one embodiment of Takeda, the entire image is reduced to fit into a user-defined partial "window." The reduced image is then enlarged at the direction of the user until the characters displayed are large enough to be recognized. If the enlargement creates an image too large to be displayed in the partial window, the user may scroll the original image until the desired partial area to be stored is displayed in the window.

Although the indexing system described in Takeda can be used to create index images that are recognizable and readable, this solution is both cumbersome and inefficient. In Takeda, five steps are required to store an index image: (1) the partial area window is defined; (2) the original image is reduced to fit within this partial area window; (3) the original image is repeatedly enlarged or reduced by the user until the character or image is legible; (4) the original image is scrolled up, down, left or right by the user until the desired portion of the original image is displayed in the partial area window; and (5) a copy of the index image displayed in the window is stored. This system is time-consuming in that a user must repeatedly reduce and enlarge the image manually, by trial and error, to produce an index image that is both legible and recognizable. This trial and error procedure increases operation and storage time considerably. Further, storage of the entire image displayed in the window for every index image requires a large storage capacity.

In a typical indexing system, a portion of an original document is selected, copied, and stored for use as a visual index. A collection of these visual indexes are displayed in a gallery. By choosing one of these visual indexes, the associated original document is retrieved and displayed.

Confusion may arise when the computing system must differentiate a selection gesture from text or graphic information. For example, if the user is allowed to select a portion of a document merely by drawing a closed curve around the desired screen information, the selection system must be able to differentiate this closed curve from various other closed curves that may occur during normal handwriting. Many letters (e.g., a, b, d, e, g, o, p, q) contain a closed curve. Further, the selection system should be able to discern between the case where the user wants to select and where the user merely wants to draw a closed curve on the page.

Unfortunately, prior art methods for selecting that portion of the original document that is to serve as the indexing segment are cumbersome and inefficient. For example, in one prior art method, a separate selection mode is used. The user must touch a button or icon to activate the selection mode, and then delineate the selected area of the screen. Use of a separate button requires movement from the writing area to the button, and then back again, interrupting the user's normal writing action.

In another prior art method, selection is accomplished by pressing a button located on the barrel of the pen. Using this button is often awkward for the user, who may activate it accidentally during normal writing. Further, not all pen-based computing systems include a button on their pen or stylus.

Another prior art selection method involves having the user maintain a constant pen position on the screen for a certain amount of time. The detection of a "hold time out" serves as a selection delimiter. In other words, holding the pen still touching the screen signals the computing system that the user wishes to enter selection coordinates. A drawback of this prior art method is that people frequently hold their pen still while thinking, resulting in inadvertent activation of the selection mode. Alternatively, people may anticipate that they have held the pen steady long enough even when they haven't, resulting in repeated attempts to activate the selection mode. Also, the "hold time out" may misinterpret a period (".") as a hold.

Still another prior art method detects the proximity of the pen from the screen and uses this proximity as a delimiter for activating the selection mode. The problem with this method is that users typically do not pay attention to the spatial relationship between the pen and the screen, resulting in inadvertent selection activation.

SUMMARY OF THE INVENTION

The present invention provides a method and apparatus for selecting and indexing stored information for subsequent retrieval. The indexing system of the present invention indexes pages by storing a reference to a selected graphic segment of the displayed original page (instead of a copy of the graphic segment) as the index. Retrieval of the original file is accomplished by choosing from a listing of several categories of indexes, and then selecting an index entry displayed in the index gallery.

The present invention provides a selection method using a lasso-tap gesture that allows the user to select a portion of the data for indexing (or other operations) without disrupting the natural handwriting action. Selection is accomplished using a closed (or nearly closed) curve followed by a recognized gesture within the closed curve within a specified time period. A local minimum established by the end points of the closed curve and the closed curve itself must fall within a specified range to identify the closed curve as a selection lasso. In one embodiment, recognized gestures for selection, enlargement, deletion and indexing are supported.

The user may compile indexes comprised of any graphic segment from an original document. These indexes are displayed in user defined multiple indexes. Different segments from the same file may be compiled in the same index, or in different indexes. Graphic segments may be selected from any displayed page in the file, including spreadsheet pages or word processor pages, in addition to calendar pages and blank notebook pages.

In one embodiment of the invention, segment selection and indexing is accomplished by circling the selected section with a hand-held stylus on the display screen, tapping the display with the stylus in the interior of the lasso, and targeting an indexing gesture to the lasso. In another embodiment, tapping in the lasso is not required. In still another embodiment, the user may invoke the indexing command by selecting from a pull-down or pop-up menu.

Because each index provides a window into the current contents of the associated original document, the graphic indexing segment always contains the current information stored in the original file at the location where the indexing segment was taken.

BRIEF DESCRIPTION OF THE DRAWINGS

FIG. 1 illustrates an example of stored information on a calendar page.

FIG. 2 illustrates an example of data stored on a blank notebook page.

FIG. 5 illustrates the selection of an indexing segment using the lasso and gesture method of the preferred embodiment.

FIG. 6 illustrates the indexing segment window and index menu of the preferred embodiment.

FIGS. 7A and 7B illustrate "Meetings" index pages of the preferred embodiment.

FIGS. 9A–9C illustrate more indexing segment windows and index menus of the preferred embodiment.

FIG. 11 illustrates a "Phone Numbers" index page of the preferred embodiment.

DETAILED DESCRIPTION OF THE INVENTION

A method for indexing and storing graphic image data is described. In the following description, numerous specific details, such as methods of selection, methods for invoking commands, etc., are described in detail in order to provide a more thorough description of the present invention. It will be apparent, however, to one skilled in the art, that the present invention may be practiced without these specific details. In other instances, well-known features have not been described in detail so as to not obscure the present invention.

The present invention is preferably used with pen-based computer operating systems such as PenPoint™ manufactured by GO Corporation of Foster City, Calif., and Microsoft Windows for Pen™ from Microsoft Corporation. However, the invention can be used with other operating systems (both pen-based and non pen-based) as well.

Pen-based operating systems such as PenPoint™ provide input/output information to applications running under the operating system and provide certain functions and utilities that can be used by the applications. For example, Pen-Point™ provides certain data about stylus position and movement (such as "pen down", "pen up", "pen into proximity", "pen out of proximity", pen position, and a record of pen movement), provides certain handwriting recognition algorithms, and provides access to a number of standard commands, including certain "gestures."

Figure 13:
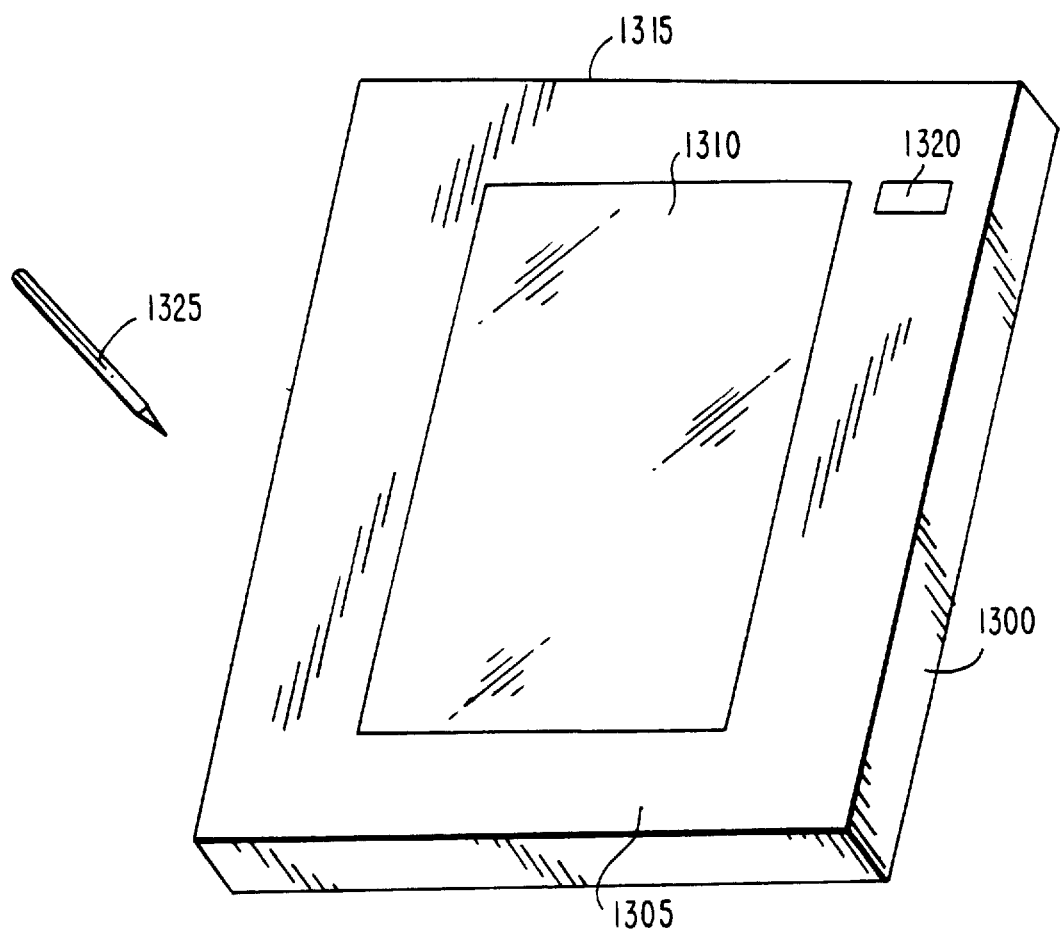
FIG. 13 illustrates a pen-based computer system that may be used with the preferred embodiment.

FIG. 13 illustrates an example of a handwriting entry computer of a type that may be used with the present invention. It consists of housing 1300. The front of the housing 1305 features a position sensing display panel 1310 and a power switch 1320. Input/output ports for a disk drive, communications, and a printer, a power supply socket, and a contrast control (not visible) are located along the back side 1315 of housing 1305.

Position sensing display panel 1310 consists of an electrostatic, position sensing surface combined with a monochrome, liquid crystal display. The display has a resolution of approximately 640 by 400 pixels. The position sensing surface senses the position of a special stylus 1325 when the tip of the stylus contacts or is brought into close proximity with the surface.

The stylus may be used to write characters, "gestures," words or illustrations on the display, as well as to select and manipulate displayed items. The handling of handwritten input generally depends on the specific software application being used.

"Gestures" are pen movements (typically sequences of three strokes or less) that invoke certain specified commands. The present invention utilizes approximately seven standard "gestures." Examples of these "gestures" are an "X," which is used to delete, a "flick" up, which is used to zoom, and "taps" or "presses" which are used to invoke commands.

For the present invention, handwritten input is preferably recorded as a series of strokes. Each stroke consists of the movement of the stylus from a "pen down" event (i.e., the stylus tip making contact with the display) to the immediately following "pen up" event (i.e., the stylus tip terminating contact with the display). FIGS. 10A–10D illustrate how data points for a stroke are recorded for one embodiment of the invention.

Figure 10A:
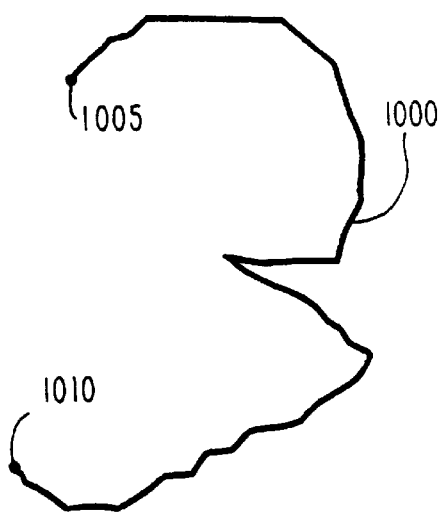
FIGS. 10A–10D illustrate how descriptors for a handwritten character are determined.

FIG. 10A is an enlarged view of a handwritten stroke 1000 that represents the FIG. "3". The beginning point of stroke 1000, that is, the point where the stylus first makes contact with the display, is at point 1005. The end point of stroke 1000, that is, the point where the stylus is lifted from the display, is at point 1010.

The display is continually sampled at a rapid rate (in one embodiment, approximately 200 times per second), to determine whether the stylus is contacting the display, and, if so, the coordinates of the point of contact.

Figure 10B:
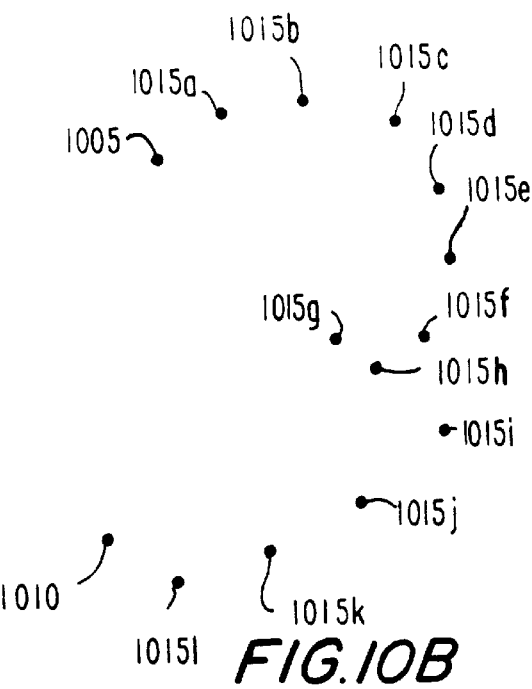

The stroke recording process begins when the tip of the stylus makes contact with the display. A "pen down" event is recorded, and the coordinates of the contact point are stored. At each succeeding sampling interval, the new position of the stylus is determined. FIG. 10B illustrates the positions 1015a to 1015l of the stylus for each sampling interval between the "pen down" event at point 1005 and the "pen up" event at point 1010.

Figure 10C:
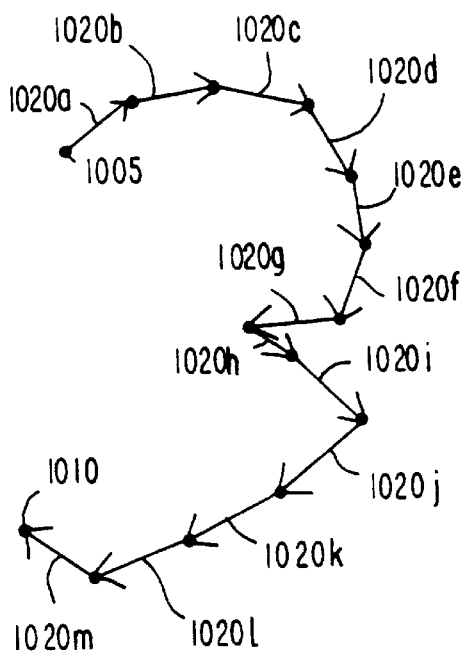

Although it is possible to describe stroke 1000 in terms of the coordinates of "pen down" point 1005, intermediate positions 1015a to 1015l, and "pen up" point 1010, it is preferable to describe a stroke in terms of the relative change in position, or "delta", from each sampled position to the succeeding one. FIG. 10C illustrates stroke 1000 in terms of "pen down" point 1005 and "deltas" 1020a to 1020m. The "deltas" are recorded as relative changes in horizontal ("x") and vertical ("y") positions, respectively.

Figure 10D:
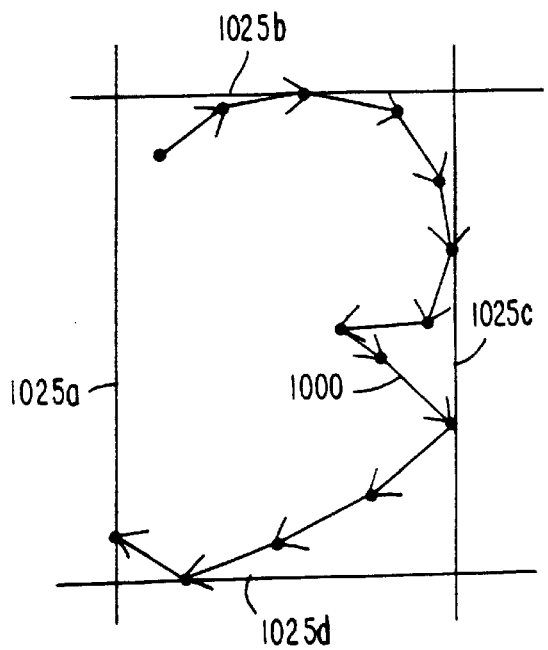

An additional piece of information about a stroke that may be recorded is the stroke's "bounds," shown in FIG. 10D. The "bounds" of a stroke are the maximum limits reached by the stroke in the horizontal and vertical directions. These limits are designated items 1025a through 1025d in FIG. 10D.

Handwritten input to the computer usually does not consist of a single stroke. Instead, handwriting generally consists of letters, numbers or words made up of groups of separate strokes. Strokes that are part of the same handwritten entry typically are closely spaced both in time and in position. In some pen-based operating systems, if the "pen down" event of a subsequent stroke occurs within approximately 500–1000 milliseconds (the exact interval is user selectable) of the "pen up" event of the preceding stroke, the subsequent stroke is considered to be part of the same handwritten entry as the preceding stroke. The same may also be true if the second stroke is made without the stylus being brought out of proximity with, or raised more than approximately one-half inch above, the display screen between the "pen up" event of the first stroke and the "pen down" event of the second stroke.

In addition to or instead of the stroke description method described above, other forms of handwritten stroke descriptions may be used. Furthermore, depending on the specific embodiment of the invention, input means other than a hand-held stylus may be used to provide input to the invention. For example, input produced by a keyboard, a mouse, a mouse-pen, a light pen, a finger (in conjunction with a touch sensitive panel), a scanner, a video digitizer, or a digitizing pad may be used.

The present invention relates to a way of quickly and efficiently indexing information so that the information can be retrieved easily without needing to know what file it is stored in, the name of the file, or where the file is stored.

The preferred embodiment of the invention may be incorporated into microcode instructions for controlling the processing unit of a computing system. Similarly, the present invention may also be "hard wired" into the hardware of the computing system. As described above, the preferred embodiment of the present invention is incorporated into computer software for use with a pen-based operating system for pen-based computers. However, the inventive method can be used with a wide variety of other operating systems and other computers and computing systems without departing from the spirit and scope of the invention.

In the preferred embodiment of the present invention, a file is indexed by selecting the relevant indexing segment on any displayed page of data, and storing a reference to that segment in a user-defined index. For example, going back to FIG. 1, suppose the user wants to use the time and date of the meeting with Joe Brown as an indexing segment.

First, the user selects the portion of the original page of information that is to serve as the index segment. FIG. 5 illustrates one way of selecting an indexing segment. To select a portion of the displayed information in the preferred embodiment of the present invention, the user first circumscribes the desired graphic indexing segment to be selected with a dosed curve, or "lasso," 501. Next, the user makes a small mark, or "tap," within the boundary of the lasso. An example of a selection "lasso" 501 is. shown in FIG. 5.

An example of a lasso for use with the preferred embodiment is also illustrated in FIGS. 3A–3D. The lasso 3000 is drawn with a single continuous stroke from start point 3005 to end point 3010. The lasso need not actually dose, and may be of any shape or size so long as the start and end points are within a certain distance from each other. Additionally, the lasso may overlap, or have a "tail."

Figure 3A:
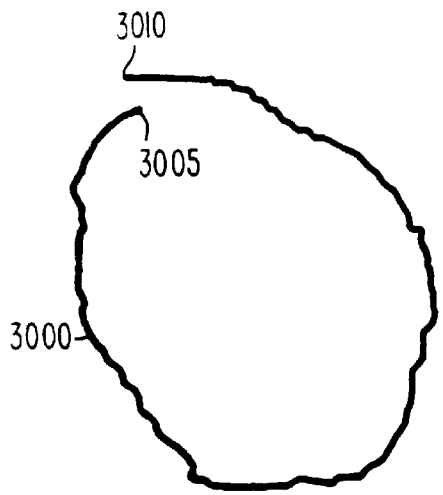
FIGS. 3A–3D illustrate how a local minimum for the end points of a lasso is determined.

FIG. 3A is an enlarged view of a handwritten stroke 3000 that may represent a lasso. The beginning point of stroke 3000, that is, the point where the stylus first makes contact with the display, is at point 3005. The end point of stroke 3000, that is, the point where the stylus is lifted from the display, is at point 3010.

Figure 3B:
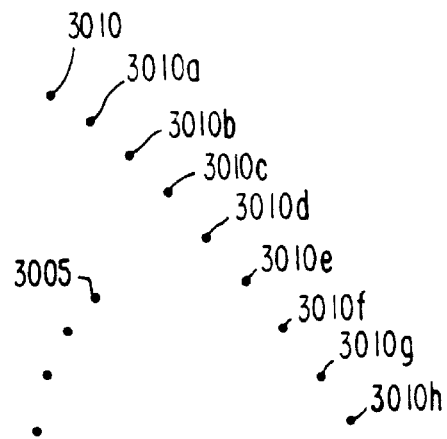
Figure 3C:
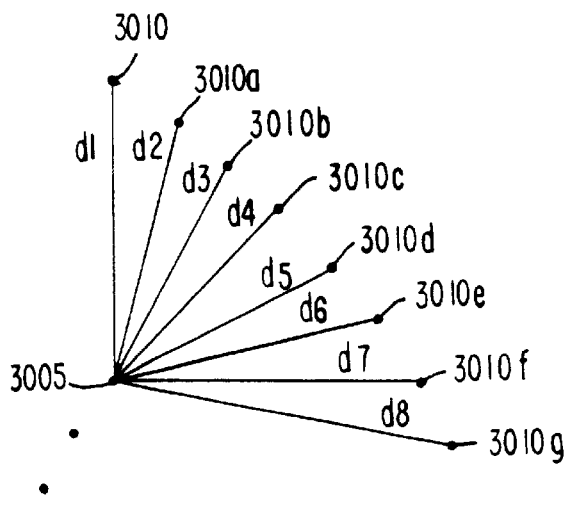

At each succeeding sampling interval, the new position of the stylus is determined. FIG. 3B illustrates the positions 3010$a$ to 3010$h$ of the stylus for a set of sampling intervals immediately preceding the "pen up" event at point 3010.

To determine whether the start point 3005 and end point 3010 of a stroke 3000 are close enough to constitute a lasso, the selection system first computes the distance from the start point 3005 to the end point 3010. This distance is shown as $d_1$ in FIG. 3C. This distance may be expressed in many possible ways, including number of points, ⅟20th's of a point (twips), stroke units, screen inches, or any other suitable unit of measurement. After computing this first distance $d_1$, the selection system next computes the distance $d_2$ from the start point 3005 to the next to the last point from the end, point 3010$a$. The selection system continues in this manner backwards from the end point, computing the distance from the start point 3005 to the previous points along the stroke (3010$a$–3010$g$ in FIG. 3C), until a local minimum is found, or until a specified number of distances have been computed. For purposes of this application, a local minimum is defined as the point where the computed distance from that point to the start point is less than the computed distance from both its neighbors to the start point. If no local minimum is found over the finite number of computed distances, then the local minimum is defined as the smallest computed distance within the finite set. Of course, other methods of determining whether the local minimum is within bounds may be used without departing from the spirit and scope of the present invention.

In the preferred embodiment, the maximum number of points that are examined to locate a local minimum is ⅛ of the total number of points in the stroke. Using our example, if the lasso in FIG. 3A is comprised of 200 points, then the the maximum number of points that are examined is 200/8=25 points. Computing the local minimum in this way permits a stroke to have a "tail" of some length and still qualify as a lasso. The maximum length of the permitted tail may, of course, be adjusted by specifying a fraction other than ⅛.

Once a local minimum is located, the selection system compares the local minimum to a specified standard to determine if the local minimum is within a certain permissible range, that is, to determine if the start and end points 3005 and 3010 of stroke 3000 are sufficiently near each other to qualify the stroke as a lasso. In the preferred embodiment, the local minimum is compared to one of two standards depending upon the bounds of the lasso itself. Using this two-tier method, if the horizontal and vertical bounds of the lasso are less than or equal to 24 typographical points across, then the bounds of the points defining the local minimum must be no greater than 5 typographical points across vertically or horizontally for the stroke to be identified as a lasso. If the bounds of the lasso are greater than 24 typographical points across, then the bounds of the points defining the local minimum can be as large as 12 typographical points across vertically or horizontally and still qualify the stroke as a lasso. In the preferred embodiment, the smallest the vertical or horizontal bounds of a lasso can be is eight typographical points across. Of course, the present invention can be used in conjunction with any method for determining an acceptable local minimum.

Figure 3D:
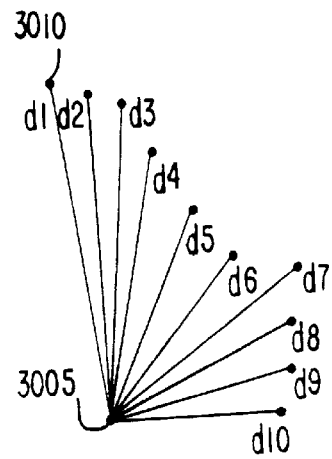

Tablet jitter and other pen tracking inaccuracies introduce some error into the local minimum computation. The faster the pen is moved across the tablet, the more jitter is introduced. Additionally, some non-linearity is present at the beginning and end of a stroke. While computing the local minimum, the selection system may confuse a momentary minimum (due to jitter) with an actual local minimum. An example of jitter is shown in FIG. 3D. The local minimum should be distance $d_{10}$. Each of the distances $d_1$ to $d_5$ is shorter than the distance immediately preceding it. However, because of jitter, distance $d_6$ is greater than distance $d_5$, leading to the erroneous conclusion that distance $d_5$ is the local minimum. To compensate for this, an error factor is included in the computation. In the preferred embodiment, a variation of up to 10% of the square of the previous distance computed (expressed in "twips," or ⅟20th of a point) is permitted without falsely generating a local minimum. In other words, if a distance $d_5$ is computed as 200 twips, then distance $d_6$ may be as high as 209 twips $(((200^2)*1.1)^{1/2} \approx 209)$ without having the selection system falsely identify the 200 twip distance $d_6$ as the local minimum.

Other restrictive requirements may be specified to tailor the system to the user and to improve the ability of the selection system to correctly identify a stroke as a lasso. For example, if a particular user generally draws closed curves or circles in a counter-clockwise direction, the selection system may be directed to look only at strokes that are drawn in a clockwise direction as possible lasso candidates. Additionally, the system could generate an indicator of some kind that the user's stroke is a candidate for a lasso (e.g., by highlighting). Other user-tailored restrictions may be used without departing from the spirit or scope of the present invention.

After circumscribing a lasso around the portion of the screen data to be selected, the user completes the selection procedure by placing a small mark with the pen, or "tapping," within the interior of the lasso. If the user does not tap within the lasso, the system interprets the closed curve as "ink." For efficiency's sake, the system should have some way of determining whether the user intends a closed curve to serve as a lasso (assuming the closed curve meets the requirements for a lasso) or merely as a closed curve. Additionally, system should be able to differentiate between when the user wants to draw a lasso-tap and when the user wants to draw a closed curve with a dot in it. Any clear indicator that the user does not intend the stroke to be a lasso may be used. One example of an indicator that may be used in conjunction with the present invention is the removal of the pen from proximity with the screen. In other words, in between drawing the closed curve and drawing the dot, the user removes the pen from proximity with the screen. Alternatively, the system may be designed to accept as an indicator any subsequent stroke or action taken externally to the lasso. For example, the user may initiate a new stroke beyond the bounds of the lasso, or may activate a menu or button on the screen unrelated to the lasso-tap, or may even turn off the computer.

In the present preferred embodiment, a time out is used as an indicator that a lasso is not intended. If the user draws a closed curve that is a candidate for a lasso (i.e., meets the local minimum requirements) and then fails to draw a dot (or any other stroke) within the interior of the closed curve within a specified time period, a "time out" occurs, and the system interprets the closed curve as "ink." In this way, if the user intends to draw a closed curve and nothing else, the system waits for the time out to occur before interpreting the closed curve as "ink."

If, on the other hand, the user draws a lasso candidate followed by a "tap" within the lasso before the time out occurs, then the system should receive some additional indication that the user intends the system to interpret the lasso and the tap together as a single gesture. Without this second indicator, the system may be unable to differentiate between a lasso-tap and a closed curve containing several taps. (e.g., a happy face). Additionally, without this second indicator, the system would wait indefinitely to process the lasso-tap. This second indicator signals to the system that the user is would like the system to process the lasso and tap strokes together as a single gesture.

Any clear indication that the user is done with the lasso-tap may be used. One example of an indicator that may be used in conjunction with the present invention is pen proximity with the screen. In other words, the user maintains proximity between the pen and the screen while drawing the lasso and the tap, and then removes the pen from proximity upon completion. The system may also be designed to accept as an indicator any subsequent stroke by the user. If the subsequent stroke is sufficiently distant from the lasso so as to clearly indicate that the user is finished with the lasso-tap gesture, the system processes the lasso-tap as a single gesture. If, on the other hand, the subsequent stroke falls within the boundary of the lasso, the system interprets the closed curve, tap, and any subsequent strokes as "ink." As described above, any action external to the lasso boundary, such as activation of a menu or button on the screen unrelated to the lasso-tap, or the power switch, can serve as an indicator.

In the present preferred embodiment of the present invention, a "time out" is also used as a second indicator. After a lasso-tap, if the system does not receive any further stroke input within a specified time period, then a "time out" occurs, and the system processes the lasso-tap gesture. If the system receives any additional stroke input during the specified time period, then the lasso-tap input is interpreted as "ink."

Although the time outs used as indicators in the present preferred embodiment are optional and may be of any length, in the present embodiment, a longer time out is used for the first time out than is used for the second time out. Use of a longer time out for the first indicator allows the user sufficient time to inspect the lasso before having to place the tap to complete the lasso-tap. Use of a shorter time out for the second indicator (similar in length to the standard handwriting recognition time out) prevents the user from having to wait for the system to process the lasso-tap before inputting additional information, while still giving the user enough time to input additional strokes inside the lasso (such as when drawing a happy face). Of course, any indicator can be used. In the preferred embodiment, the first time out is set equal to approximately five seconds, and the second is set somewhere between 0.6 to 1.0 second. Once the lasso and the tap are identified, the selection system confirms the user's selection by highlighting the lasso. In the preferred embodiment, the line defining the lasso is overwritten with a thicker grey line.

After the selection lasso is drawn and confirmed, the user may direct the system to perform operations upon the selection. In the preferred embodiment, various operations are supported by the "lasso-tap" selection system. In the preferred embodiment, each of these supported operations are initiated by drawing an associated gesture on the display. If the hot spot of the gesture falls within the boundary of the lasso, the system applies the operation associated with that gesture to the selection. The determination of each gesture's hot spot is accomplished by the particular operating system implementing the present invention. For the "X" gesture, the hot spot may be the intersection point of the two strokes making up the "X." Similarly, the hot spot for a "^" may be the tip of the "^," and the hot spot for a flick up may be the starting point of the stroke comprising the flick. Of course, other reference points may be used. The reference point may also be determined by more complex methods.

As stated above, if the hot spot of the gesture falls within the boundary of, or targets, a selection, the system applies the operation associated with that gesture to the selection. For example, if the user draws an "X" targeted to the selection, the screen information contained within the boundaries of the lasso are deleted, or erased, from the screen. Ink that falls across the lasso boundary is split as a result of deletion. In other words, if an ink stroke crosses a lasso boundary, only part of it is deleted, leaving that portion of the stroke that falls outside the lasso boundary undeleted.

If, after a lasso-tap selection, the system detects a "flick up" (an upwards stroke) targeted to the selection, the selection is enlarged, or "zoomed." To determine the extent of the enlargement, the system first locates the horizontal and vertical bounds of the lasso. A rectangle is generated using these bounds. The screen information within this rectangle is enlarged so that the rectangle fills the screen either horizontally or vertically. That is, the system determines the enlargement factor required to enlarge the rectangle up to either the horizontal or vertical screen boundaries.

Other gestures are supported after selection. For example, if the system detects a second tap targeted to the selection, the selection is de-selected and the lasso is no longer displayed. If the system detects a "hold" (a sustained contact between the pen and the tablet) targeted to the selection, a marquis is displayed for allowing the selection to be moved to another location on the screen. If the system detects a tap followed by a hold targeted to the lasso, a copy of the selection is displayed along with a marquis for re-locating the copy on the screen. Any number of other gestures may be supported with the lasso-tap selection method.

In the preferred embodiment of the present invention, if the systems detects an up caret ("^") targeted to the selection, an indexing command is invoked.

In one embodiment of the present invention, the lasso-tap-gesture procedure may be shortened to a lasso-gesture procedure. In this embodiment, after a lasso is drawn, if the selection system detects up to two strokes before a time out (approximately 1 second), the system targets the bounds of each stroke to determine if they intersect with the bounds of the lasso. If so, the strokes are then processed by a gesture translator to determine if the strokes define a supported gesture. In the preferred embodiment, three gestures (other than a tap) are supported after a lasso: zoom (flick up), delete ("X"), and index ("^"). As long as the hot point of one of these three gestures is targeted within the selection, the operation associated with the gesture is performed upon that portion of the document circumscribed by the lasso. If the detected strokes are not a recognized gesture, the lasso and the strokes are displayed as ink on the screen. If the strokes describe a gesture, but not one that is targeted to the lasso, then the lasso and the strokes are displayed as ink. Of course, any number of gestures may be supported by the lasso-gesture method without departing from the spirit or scope of the present invention.

Returning to FIG. 5, after the lasso 501 is drawn and an up-caret "^" 502 is targeted to lasso 501, the operating system receives and interprets the "^" 501 as an invocation for the index command. In the preferred embodiment, two actions take place, as illustrated in FIG. 6. First, the operating system computes a rectangular boundary 601 based on the bounds of the selection lasso 501. That portion of the display that is bounded by rectangle 601 becomes the indexing segment 603.

Second, once the index command has been issued, a list of possible indexes is displayed on display 1302. For example, a "pop-up" index menu window 602 could appear on the display 1302. Index menu window 602 displays a list of the currently available indexes. In FIG. 6, three indexes are listed: "Phone Numbers," "Meetings," and "Charts/Figures." Of course, the user may invoke the indexing command in other ways without departing from the spirit and scope of the invention. For example, the user could select "index" from a pull-down menu at the top of the display screen. Additionally, pop-up menu 602 includes a "New Index" button 604 that allows the user to enter the name of a new index.

In order to index the selected indexing segment 603 within rectangle 601, the user selects an index name from an index window 602. This selection may be accomplished by "tapping" on the desired index name appearing in window 602 with the hand-held stylus 404. Equivalently, the index may be selected by positioning the cursor over the desired index name and "clicking" a mouse, track-ball, etc., to select. In the preferred embodiment, the user may select as many indexes as desired. Once the indexes are selected, the indexing segment 603 within rectangle 601 is compiled in the selected indexes. For example, by selecting Joe Brown's name and the date and time of the lunch meeting using the "lasso-up caret," and selecting the index entitled "Meetings," the indexing segment 603 defined by rectangle 601 appears in index 701 illustrated in FIG. 7A as index entry 703.

To create the index entry 703, the system determines the coordinates of the lower left vertical 610 of the rectangle 601, and the width $X_b$ and height $Y_b$ of the rectangle (expressed in twips), as shown in FIG. 6. These coordinates and bounds are stored along with the page I.D., which includes the page type, and the record I.D. This page I.D. information is used to display the originating information as a part of each index entry.

When an index entry is displayed, the indexing system retrieves the stored coordinates and bounds associated with the index entry, and displays the current information stored at that location. By storing the coordinates and bounds of the rectangle defining the indexing segment instead of a copy of the page at that location, two purposes are served. First, each index serves as a window into the current contents of a previously stored page. This guarantees that changes made to the original document that fall inside the graphic segment rectangle are reflected in the associated index entry. Second, memory is conserved since generally it takes less memory to store the coordinates than to store the entire contents of the rectangle. Of course instead of storing the coordinates and bounds of the rectangle, the system could store a copy of the graphic segment as the index entry without departing from the spirit or scope of the present invention.

At the top of index 701 is a title 702 where the index name appears. In FIG. 7A, the index 701 is entitled, "Index: Meetings." The current contents of index entry 703B are displayed in index 701. An informational header 703A is appended to the top of index entry 703B. Header 703A includes information concerning the original file and page number to which the index entry 703B is associated, as well as a sequential numbering system. In our example, informational header 703A contains the phrase "Item 1 (August 1991)." This indicates that index entry 703B is the first item in index 701, and that index entry 703B may be used to retrieve August 1995 calendar page 101.

After the indexing segment is identified, the present invention rescales the dimensions of the indexing segment so as to fit into the index entry window. First, the appropriate scaling factor is determined by comparing the vertical and/or horizontal dimensions of the rectangular box defined by the bounds of an indexing segment to the vertical and horizontal display dimensions of the index entry window. The dimensions of the index entry window may be specified by the user or in some other manner.

Figure 4A:
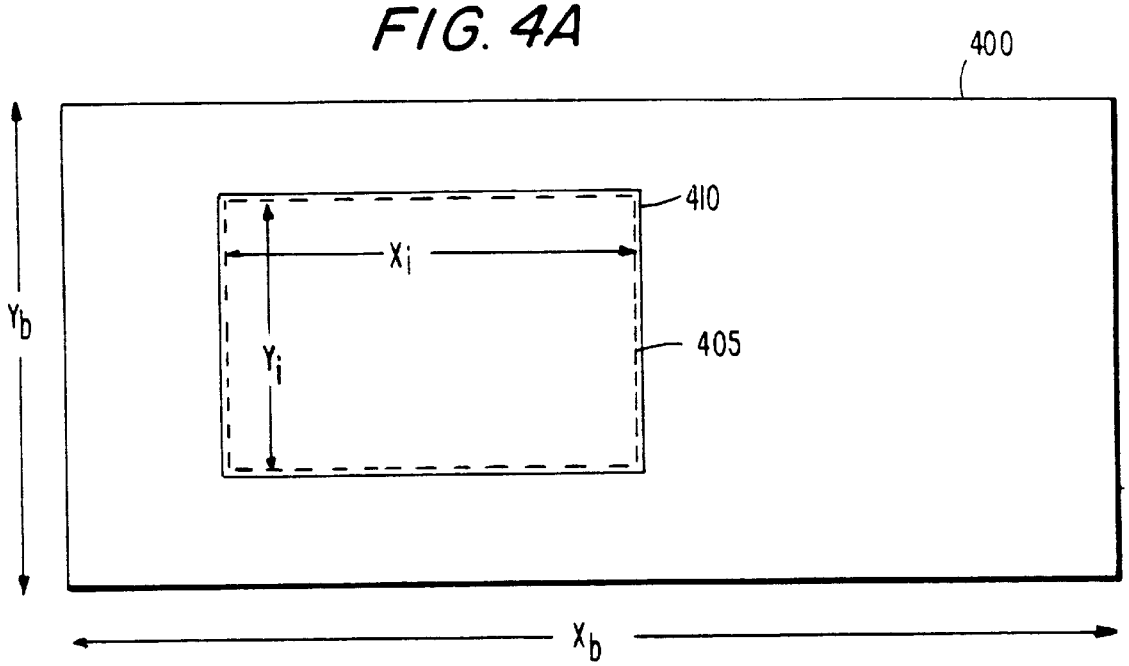
FIG. 4 illustrates how an indexing segment is scaled to fit an index entry window.

FIG. 4A illustrates the x and y dimensions for bounds 400 of the indexing segment and for the index entry window 405. "$X_b$" is the horizontal dimension of bounds 400. "$Y_b$" is the vertical dimension of bounds 400. "$X_c$" and "$Y_c$" are the corresponding horizontal and vertical dimensions, respectively, of the index entry window 405. Index card window 405 is slightly smaller than the boundaries of the actual index entry 410 to provide some clearance between the contents of the indexing segment 400, when it has been scaled to fit the index entry window 405, and the boundaries of the index entry itself.

The factor used to scale the indexing segment 400 depends on the type of scaling desired. The factor by which the size of the indexing segment 400 must be reduced or enlarged in order for it to fit within the index entry window 405 is the smaller of the two ratios $Y_c/Y_b$ and $X_c/X_b$.

Accordingly, to scale the indexing segment 400 to fit within the index entry window 405, ratios $Y_c/Y_b$ and $X_c/X_b$ are calculated. The smallest is selected as the scaling factor for the indexing segment 400.

Figure 4B:
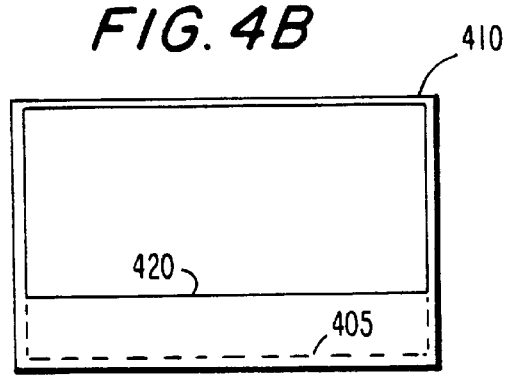

FIG. 4B illustrates the scaling of an indexing segment that is larger than the index entry window. Scaling the stroke coordinates and each of the horizontal and vertical components of an indexing segment 400 in the manner described scales the bounds of the indexing segment 400 from its original size 400 shown in FIG. 4A to the scaled size 420 (to fit in the index entry window) as shown in FIG. 4B. The scaled strokes are then displayed by using the lower left hand corner 430 of the index entry window 405 of FIG. 4B as the origin for the scaled indexing segment 420, and plotting the position of each scaled stroke point and each line segment representing each scaled delta on the display screen using a predetermined line thickness. In one embodiment, a line thickness of one pixel is used. In another embodiment, the line thickness is user selectable. Preferably, the same line thickness is used that is used to display the original, unscaled indexing segment 400 as it is entered by the stylus. The line thickness is thereby preserved when-the indexing segment 400 is scaled, enhancing the appearance of the scaled indexing segment 420 on the display.

The same scaling factor is used for both x values and y values to preserve the aspect ratio of the strokes and any other information that is on the page where the strokes are written in the original indexing segment. Alternatively, different values for the scaling factor for x values and for y values may be used. For example, the ratio $Y_c/Y_b$ may be used for y values, and the ratio $X_c/X_b$ for x values. If these ratios are used, the scaled indexing segment has the maximum possible size that will fit in the index entry window. However, the indexing segment's aspect ratio will not be preserved.

Figure 8:
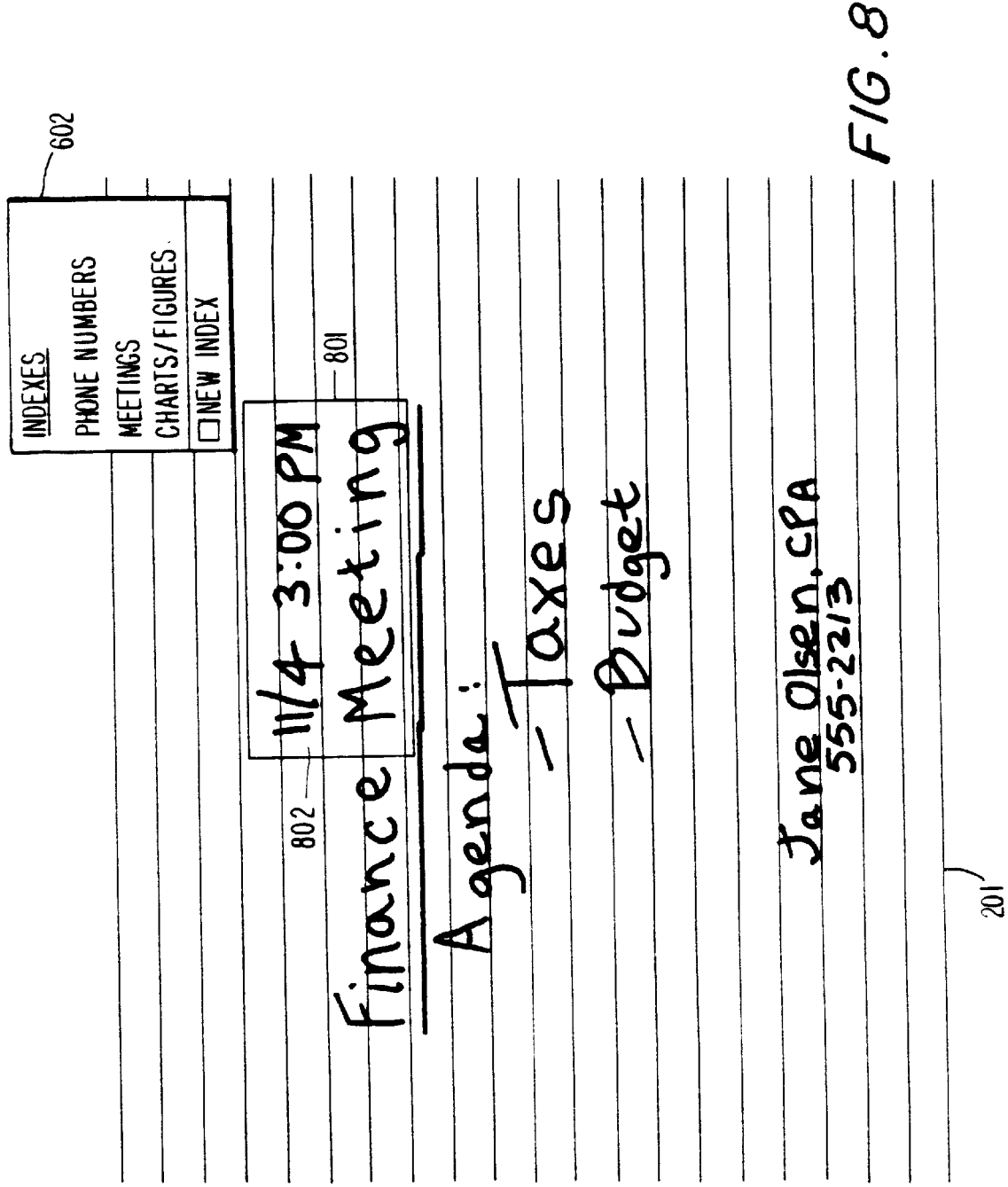
FIG. 8 illustrates another indexing segment window and index menu of the preferred embodiment.

As described in FIG. 6, the time and date of the meeting referred to in FIG. 2 may also be indexed. FIG. 8 illustrates rectangle 801, "pop-up" index menu 602, and indexing segment 802. By selecting the "Meetings" index from menu 602, indexing segment 802 is scaled to fit within index entry 705B in "Meetings" index 701 of FIG. 7A. The resulting index 704 is illustrated in FIG. 7B. FIG. 7B is substantially the same as FIG. 7A with the addition of index entry 705B. Information header 705A, containing the phrase, "Item 2 (Page 1)," is appended to index entry 705B. Header 705A tells us that index entry 705B is the second item in index 704, and that index entry 705B may be used to retrieve the first page 201 of the notebook.

To retrieve original files using the indexing segments, first an index is selected from a list of available indexes. For example, a window containing the list of currently available indexes is displayed, and the index "Meetings" is selected so that index 704 of FIG. 7B is displayed. Next, the user selects the desired data to be displayed by reviewing index entries 703A and 705B as well as their associated information headers 703A and 705A. In the preferred embodiment, selection of an original document from index 704 is accomplished by "tapping" on the display screen so that the tip of the hand-held stylus 1325 is within the boundaries of the desired index entry or its header. For example, suppose the user reads the "Lunch 1:00 Joe Brown" index entry 703B in FIG. 7B, and would like to see the entire calendar page from which index entry 703B was taken. By "tapping" the tip of stylus 1325 within the boundaries of either index entry 703B or its associated information header 703A, calendar page 101 is displayed as in FIG. 1.

Using the indexing system of the present invention, different indexing segments from the same file can be compiled in different indexes. For example, the user may select the entry "Joe Brown 555-1234" from calendar page 101 and invoke the index command by using the "lasso-up caret" gesture described above. The operating system creates rectangle 901 surrounding indexing segment 902, and displays index menu 602, as illustrated in FIG. 9A. Indexing segment 902 may then be scaled and added to the "Phone Numbers" index by selecting the appropriate entry from the index menu 602. Note that the entry "Joe Brown" may become part of index entry 1103B in the "Phone Numbers" index 1101 even though it is already stored as index entry 703B in the "Meetings" index 704.

Figure 9C:
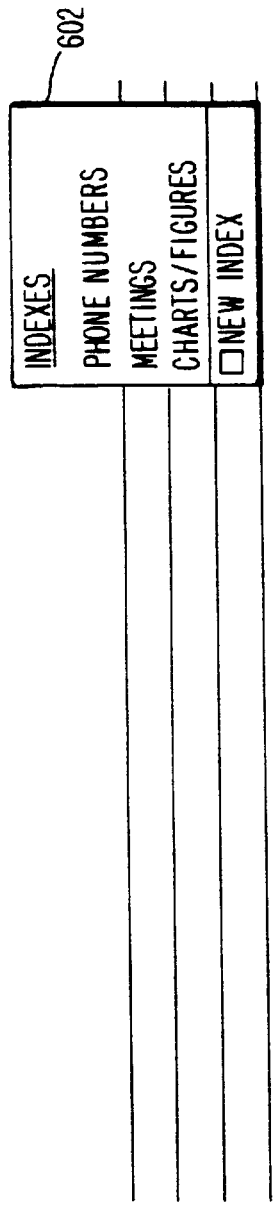

FIGS. 9B and 9C illustrate additional indexing segments that may be added to the "Phone Numbers" index 1101. In FIG. 9B, indexing segment 904 bounded by window 903 contains the entry, "Al's Cafe 555-3800." In FIG. 9C, indexing segment 906 bounded by window 905 contains the entry, "Jane Olsen, CPA 555-2213." If both of these indexing segments are added to the "Phone Numbers" index, the resulting index 1101 is shown in FIG. 11. Each index entry 1103B, 1104B, and 1105B has associated with it, and appended to it, an informational header 1103A, 1104A, and 1105A, respectively. At the top of index 1101 is the title 1102, indicating that index 1101 is the "Phone Numbers" index.

When a user wants to locate any of these phone numbers, the user calls up the "Phone Numbers" index 1101, and all the graphic index entries within that index are displayed. If the user only needs a particular phone number, a quick review of index 1101 reveals the desired phone number. If, after viewing index 1101, the user wants to see the entire page or image from which the phone number was originally taken, the user selects (e.g., by "tapping") the desired index entry from index 1101, and the original page or image is then displayed in full size. For example, selecting either index entries 1103B or 1104B reveals calendar page 101 in FIG. 1, while selecting index entry 1105B returns the user to notebook page 201 of FIG. 2. Note that selecting index entry 705B from index 704 also returns the user to notebook page 201. Thus, using the present invention, multiple indexing segments may taken from one page and compiled as index entries in the same or different indexes.

The preferred embodiment of the present invention may store any type of information displayed to the user, no matter what the original document type. For example, graphic images, untranslated text, and other screen information may all be indexed using the present invention. In fact, the present invention can use as an indexing segment any portion of a displayed page in any format.

Because the index displays the information currently stored in the associated page, any amendment or change to the original page or image is reflected in the index entry. This is true so long as the amendment or change is to data stored in the address location associated with the original indexing segment. For example, suppose that the correct spelling of Joe's name in FIG. 1 is "Browne," not "Brown." In one type of pen-based computing system, the user may effect this change using the stylus 1325 to add an "e" to the end of Joe's last name. Equivalently, using the present invention, the entry "Brown" may be circumscribed with a lasso followed by an "X" gesture targeted to the lasso, to delete the entire entry "Brown." The correct entry "Browne" is then written in its place. Either way, the amendment is reflected in all index entries associated with the changed entry. Both index entry 703B in FIG. 7B and index entry 1103B in FIG. 11 include the entry "Joe Brown." Consequently, after the amendment is made, "Brown" is no longer displayed, but "Browne" is, in index entries 703B and 1103B. Informational headers 703A and 1103A associated with index entries 703B and 1103B remain unchanged because this change to FIG. 1 does not affect the status or location of the original indexing segments 603 or 902. That is, index entries 703B and 1103B are still the first items in their respective indexes, and still display information from the August 1995 calendar page 101.

In the preferred embodiment of the present invention, changes made to the original page are reflected in the associated index entry only if the changes fall within the bounds of the original selection window. Thus, in FIG. 6, had additional information been added to calendar page 101 that fell entirely outside rectangle 601, the contents of index entry 703B would not change to reflect this amendment. For example, if the "e" added to the end of "Brown" falls outside the boundary of rectangle 601 on the display, index entry 703B remains unchanged. Thus, to assure that all changes made to the original document are accurately reflected in any associated index entries, changes made to the existing text or image should be written directly over the text or image to be changed. In our example, instead of adding the "e" to the end of "Brown" on the original document (and risking the possibility that the "e" falls outside the rectangle 601), one should cross out "Brown" and write "Browne" so that "Browne" occupies equal or less space than the original text.

Although the present invention operates using various methods of selecting indexing segments from the display, in the preferred embodiment, a "lasso-tap-up caret" or "lasso-up caret" gesture is used. Of course, the "lasso-gesture" method for selecting displayed text or image information and invoking a command may be used to invoke any command. For example, the "lasso-tap" could be used to invoke commands such as highlight, recognize characters (to be used with handwriting recognition systems), translate, as well as other word processing or spreadsheet application oriented commands.

Additionally, because the boundary of the lasso defines two regions on the display screen (that is, the area bounded by the lasso, and the area outside of the lasso and bounded by the display screen), the system may be designed so that a "lasso-tap" may be used to select a region either inside or outside the lasso, depending upon the placement of the tap. For example, if a user wishes to save certain displayed information and delete the rest, the user could lasso-tap the information to be saved, and then place an "X" outside the lasso to delete all other displayed information.

Figure 12:
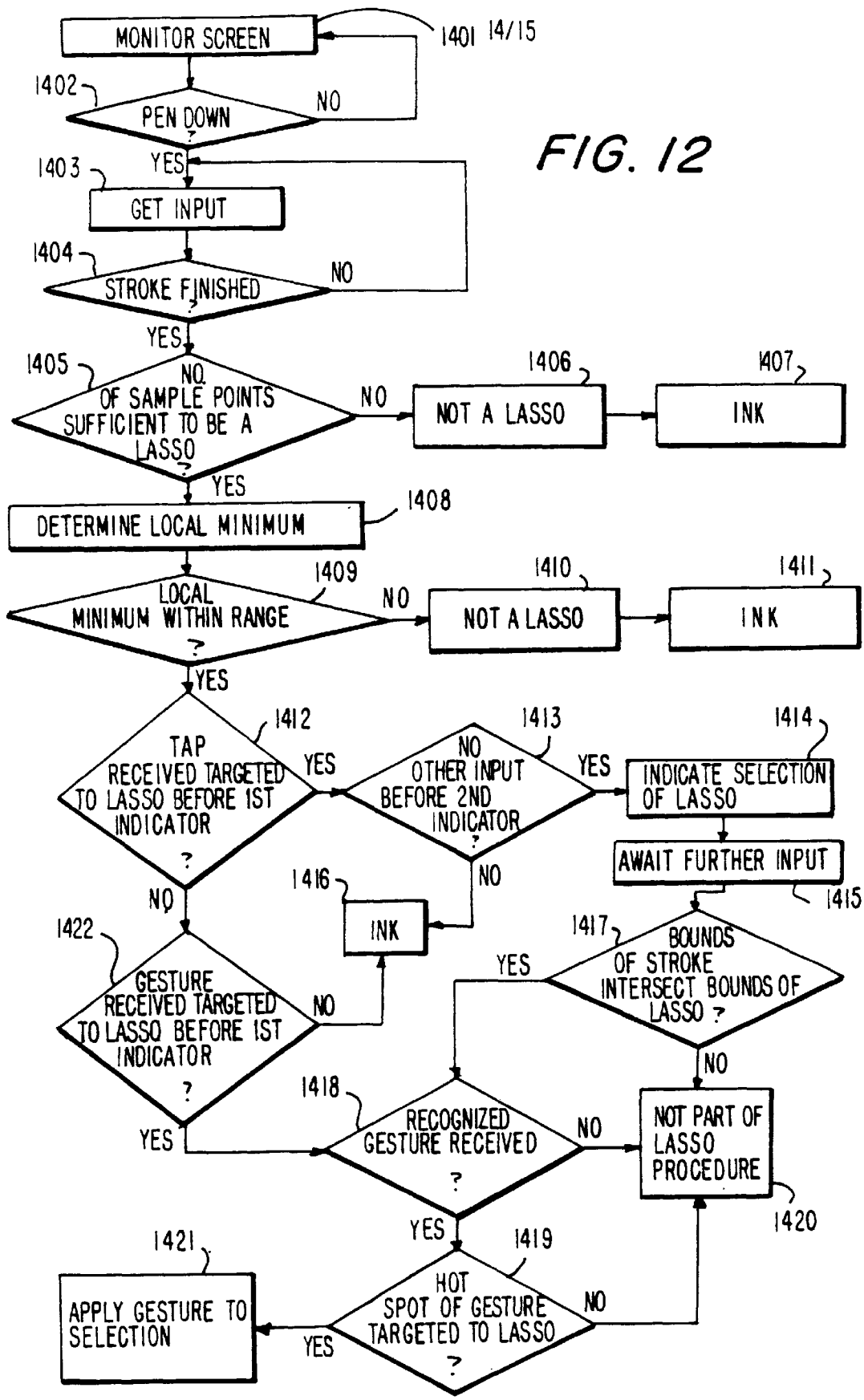
FIG. 12 is a flowchart of one embodiment of the lasso identification method of the present invention.

A flow diagram illustrating the identification of the lasso and application of any subsequent gestures described in one embodiment of the present invention is illustrated in FIG. 12. At step 1401, the screen is monitored for input. At decision block 1402, the question is asked, "Pen down?" If the answer is no, control returns to step 1401. If the answer is yes, then at step 1403, input is received. At decision block 1404 the question is asked, "Stroke finished?" If the answer is no, then control returns to step 1403. If the answer is yes, then control proceeds to decision block 1405.

At decision block 1405, the question is asked, "No. of sample points sufficient to be a lasso?" If the answer is no, then the stroke is not a lasso (step 1406), and the stroke is "inked" at step 1407. If the answer is yes, then at step 1408 the local minimum is determined. At decision block 1409, the question is asked, "Local minimum within range?" If the answer is no, then the stroke is not a lasso (step 1410), and the stroke is "inked" at step 1411.

If the answer is yes, then at decision block 1412 the question is asked, "tap received targeted to lasso before 1st indicator?" If a tap is received prior to the first indicator (a time out in the present embodiment), then at decision block 1413 the question is asked, "No other input before 2nd indicator?" If the answer to the question posed at decision block 1413 is no, then the lasso candidate is inked along with the subsequently received input at step 1416. If the answer to the question posed at decision block 1413 is yes, then at step 1414 the lasso is confirmed (by re-writing with a thick grey line in the preferred embodiment). At step 1415, further input is awaited.

At decision block 1417, the question is asked, "Bounds of stroke intersect bounds of lasso?" If the answer to this question is no, then the new input is not intended for the lasso, and control proceeds to 1420 to process the input elsewhere. If the answer is yes, then at decision block 1418 the question is asked, "Recognized gesture received?" If the answer to the question posed at decision block 1418 is no, then the new input is not supported by the lasso-tap-gesture method, and control proceeds to step 1420 and the gesture is interpreted as ink. If the answer to the question posed at decision block 1418 is yes, then at decision block 1419 the question is asked, "Hot spot of gesture targeted to lasso?" If the answer to this question is no, then control proceeds to step 1420. If the answer to this question is yes, then at step 1421 the gesture is applied to the selection.

If the answer to the question posed at decision block 1412 is no, then at decision block 1422 the question is asked, "Gesture received targeted to lasso before 1st indicator?" If the answer to this question is no, then the lasso candidate is inked at step 1416. If the answer is yes, then control proceeds to decision block 1418.

An example of code that can be used to implement selection aspect of the present invention is illustrated in Table 1.

Thus, a method for selecting, indexing, retrieving and displaying stored data is described.

TABLE 1

```
/************************************************************************
 *        File: lasso.c
 *
 *        (C) Copyright 1992 by Slate Corporation, All Rights Reserved.
 *
 *                $Revision:   1.2  $
 *                $Author:     JWARD  $
 *                $Date:    23 Jan 1992 10:52:02  $ $Modtime:    21 Jan 1992 22:48:02  $
 *                $Logfile:    S:/dtmr/xxdtmr/lasso.c_v  $
 *
 *        Revision history:
 *                $Log:    S:/dtmr/xxdtmr/lasso.c_v  $
 *
 *    Rev 1.2   23 Jan 1992 10:52:02   JWARD
 * Checked back in while testing new make files.
 *
 ************************************************************************/

/************************************************************************ lasso.c
        (C)     Copyright 1991, Slate Corporation, All Rights Reserved.

Author:                Eric Johnson
        Date:                  11-22-91

Contains the code for what is needed to do our "lasso-tap-gesture" or
        "lasso-gesture-terminate" code.

************************************************************************/ include <port.h>
include <debug.h>
#include <fakemem.h>
#include <frdwin.h>
#include <frdink.h>
#include "fredutil.h"
#include "llbuff.h"
#include "fred.h"
#include "fredink.h"
#include "lasso.h"

#define lassoStrokeMinSize                 160                    /*       8 pts    */
define strokeThreshholdSize           480                   /*    24 pts  */ define smallStrokeMaxEndDist          100                   /*     5 pts  */
define largeStrokeMaxEndDist          240                   /*    12 pts  */ define maxGestureStrokes              2
define maxLassoStrokes                (maxGestureStrokes + 1)
#define maxLassoTapStrokes             (maxGestureStrokes + 2)

/*------------------------------------------------------------------------

FRED_LASSO_STATES
                List of states that the lasso code currently uses.
*/
```

79200.916                 34              Express Mail #RB717153019US

```
typedef enum { lassoNoLasso = 0,
        lassoPending,
        lassoTapPending,
        lassoGesture,

}       FRED_LASSO_STATES;

/*-----------------------------------------------------------------

LASSO_INFO
                Contains information used to check for a cool-lasso tap.

*/
typedef struct {

LLBUFF_HEADER           lassoBuffer;            //      strokes currently being checked.
        LLBUFF_HEADER           regularBuffer;          //      strokes to process normally.

FRED_LASSO_STATES       lassoState;             //      what state of lasso checking.

U16                                     strokesProcessed;       //      strokes I have looked at UNKNOWN                 ukWin;                  //      the window in which to draw FFIXED                  penToTwips;             //      conversion from pen units to twips
        FFIXED                  penToDevice;            //      pen to device units conversion

}       LASSO_INFO, FLAT * P_LASSO_INFO;

typedef H_UNKNOWN               H_LASSO_INFO;

//-----------------------------------------------------------------
//
//      Checks strokes until it decides that it cannot pass on any more strokes.
//
BOOLEAN
LassoCheckNewStroke(
        P_LASSO_INFO            pLassoInfo,             // info about the lasso check state
        P_LASSO_TYPES           pHitResult,             // return of what type.
        PH_UNPACKED_STROKE      phSelStroke);           // the lasso, if any.

//-----------------------------------------------------------------
//
//      "Passes" on strokes from the lasso buffer to the regular buffer.
//      Really, this routine transfers strokes from the beginning of the lasso
//      buffer to the end of the regular buffer for strokes.
//
void LassoPassOnStrokes(
        P_LASSO_INFO            pLassoInfo,             //      lasso information.
        U16                                     uStrokeCount);  //      how many strokes to pass on?

//-----------------------------------------------------------------
//      Returns true if the first stroke in the lasso buffer is indeed a lasso.
//
BOOLEAN
```

```
        IsALasso(
                P_LASSO_INFO           pLassoInfo,
                H_UNPACKED_STROKE      hStroke);

5  //------------------------------------------------------------------------
    //     Returns true if the 2nd stroke in the lasso buffer is indeed a tap in
    //     the lasso (the first stroke).
    //
    BOOLEAN
10  IsATapInLasso(
                P_LASSO_INFO           pLassoInfo,
                H_UNPACKED_STROKE      hStroke);

//------------------------------------------------------------------------
15  //     returns true if a point falls in a lasso.
    //
    BOOLEAN
    PtInLasso(
                P_LASSO_INFO           pLassoInfo,
20              P_XY32                         pCheckPt);

//------------------------------------------------------------------------
    //     Returns true if the given stroke hits the lasso.
    //
25  //
    BOOLEAN
    StrokeHitsLasso(
                P_LASSO_INFO           pLassoInfo,
                H_UNPACKED_STROKE      hTestStroke);
30
    //------------------------------------------------------------------------
    //     Get the stroke currently under consideration
    //
    H_UNPACKED_STROKE
35          GetCurrentStroke(P_LASSO_INFO pLassoInfo);

//------------------------------------------------------------------------
    //     Check for a gesture on the selection.
    //
40  LASSO_TYPES
    CheckForGesture(
                P_LASSO_INFO           pLassoInfo,                  //    the lasso info
                U16                            skipStrokes,         //       how many
    strokes to skip?
45              BOOLEAN                        withTimeout);        //    has a timeout //------------------------------------------------------------------------
    //     Heres a utility routine that gets called when I have found a valid lasso,
    //              and I need to get the lasso stroke and dispose of all the others.
50  //
    VOID
    GetLassoSelection(
                P_LASSO_INFO           pLassoInfo,                  //    lasso information.
                PH_UNPACKED_STROKE     phSelStroke);      //    selection stroke info.
55
    /***************************************************************************

LassoCheckInit
                    Allocates a structure which is used for checking for lasso-tap
60          flavored stroke sets.

returns:        any errors that might occur.
```

```
        /****************************************************************************/
        STATUS
        LassoCheckInit(
                PH_UNKNOWN              phLassoInfo,
   5            FFIXED                  penToTwips,
                FFIXED                  penToDevice,
                UNKNOWN                 ukWin)
        {
                STATUS          s;
  10            P_LASSO_INFO    pLassoInfo;

//
                //      Allocate the information for the lasso tap checker.
  15            //
                StsRet(FakeMemAlloc( SizeOf(LASSO_INFO), phLassoInfo), s);

pLassoInfo = FakeMemLock(*phLassoInfo);

20            //
                //      Fill out the initial fields of the lasso check structure.
                //
                LLBuffInit(&pLassoInfo->lassoBuffer);
                LLBuffInit(&pLassoInfo->regularBuffer);
  25
                pLassoInfo->lassoState = 0;

//
                //      No strokes yet processed
  30            //
                pLassoInfo->strokesProcessed = 0;

//
                //      Save away the conversion factor
  35            //
                pLassoInfo->penToTwips = penToTwips;
                pLassoInfo->penToDevice = penToDevice;

pLassoInfo->ukWin = ukWin;
  40
                FakeMemUnlock(*phLassoInfo);

return stsOK;
        }       /*      end of LassoCheckInit()  */
  45

/****************************************************************************

LassoCheckFree
  50                    Get rid of the lasso check state information.

returns:        any errors that might occur.

****************************************************************************/
  55    VOID
        LassoCheckFree(
                H_UNKNOWN               hLassoInfo)
        {

60            FakeMemFree(hLassoInfo);

}       /*      end of LassoCheckFree()  */
```

```
/****************************************************************************
        LassoGetStroke
                Gets a stroke from the lasso buffer engine.  If this routine returns
        null, then there are no more strokes to get from the Lasso buffer.

****************************************************************************/
H_UNPACKED_STROKE
LassoGetStroke(
        H_UNKNOWN               hLassoInfo)
{
        P_LASSO_INFO            pLassoInfo;
        H_UNPACKED_STROKE       hStroke;

pLassoInfo = FakeMemLock(hLassoInfo);

hStroke = hNull;

if (pLassoInfo->regularBuffer.uItemCount != 0) {
                LLBuffRemoveItem(&pLassoInfo->regularBuffer, 0, &hStroke);
        }

//
        //      Unlock and return
        //
        FakeMemUnlock(hLassoInfo);

return hStroke;

}       /*      end of LassoGetStroke() */

/****************************************************************************
        LassoCheckStroke
                Adds a new stroke to the lasso structure.  It loops to determine
        whether anything fancy should happen with the new stroke.

returns:

****************************************************************************/
void
LassoCheckStroke(
        H_UNKNOWN                       hLassoInfo,
        H_UNPACKED_STROKE               hNewStroke,
        P_LASSO_TYPES                   pResult,
        PH_UNPACKED_STROKE              phSelStroke)
{
        P_LASSO_INFO    pLassoInfo;
        BOOLEAN                 retry;

//
        //      Clear the return value right away
        //
        *phSelStroke = hNull;
        pLassoInfo = FakeMemLock(hLassoInfo);

//      Add the stroke to the lasso buffer.
        LLBuffAppendItem(&pLassoInfo->lassoBuffer, hNewStroke);
```

```
        do {

//      Loop checking the new stroke information
                retry = LassoCheckNewStroke(pLassoInfo, pResult, phSelStroke);

} while (retry);

//
        //      Unlock and return.
        //
        FakeMemUnlock(hLassoInfo);

}       /*      end of LassoCheckStroke()       */

/*****************************************************************************

LassoCheckNewStroke
                When a stroke comes in, this routine should be called repeatedly until
        it returns false (retry...)

This is one of the more interesting routines in Fred, because it is
        essentially attempting to "recognize" what the user intended.  Watch out
        it may be a little complicated.

returns:

*****************************************************************************/
BOOLEAN
LassoCheckNewStroke(
        P_LASSO_INFO            pLassoInfo,
        P_LASSO_TYPES           pHitResult,
        PH_UNPACKED_STROKE      phSelStroke)
{
        BOOLEAN                 retry;
        H_UNPACKED_STROKE       hCurStroke;

//
        //      Flag that this particular arrangement should be retried.
        //
        retry = true;
        *phSelStroke = hNull;
        *pHitResult = lassoNone;

hCurStroke = GetCurrentStroke(pLassoInfo);

switch (pLassoInfo->lassoState) {
                case lassoNoLasso:
                        //
                        //      No lasso, check for a lasso now.
                        //
                        if (IsALasso(pLassoInfo, hCurStroke)) { pLassoInfo->lassoState = lassoPending;
                                pLassoInfo->strokesProcessed = 1;
                        }
                        else {

//
                                //      This didn't look like a lasso, so pass it on
                                //
                                LassoPassOnStrokes(pLassoInfo, 1);
```

```
                    }
                    break;

case lassoPending:
                //
                //      I have a lasso, but now check for a tap, otherwise, enter
                //              the lasso gesture state.
                //
                if (IsATapInLasso(pLassoInfo, hCurStroke)) {
                        pLassoInfo->lassoState = lassoTapPending;

//
                        //      Now I know that I have processed two strokes
                        //
                        pLassoInfo->strokesProcessed = 2;

}
                else if (StrokeHitsLasso(pLassoInfo, hCurStroke)) {
                        pLassoInfo->lassoState = lassoGesture;

//
                        //      Again, I know that I have processed two strokes
                        //
                        pLassoInfo->strokesProcessed = 2;

}
                else {
                        //
                        //      Send the "lasso" on to be processed normally
                        //      And return to the state with no lasso.
                        //
                        LassoPassOnStrokes(pLassoInfo, 1);
                }
                break;

case lassoTapPending:
                //
                //      I have a lasso and a tap, now check for a gesture.
                //
                if (StrokeHitsLasso(pLassoInfo, hCurStroke)) {

//
                        //      Look like I have processed this stroke for translating
                        //              the gesture.
                        //
                        pLassoInfo->strokesProcessed++;

*pHitResult = CheckForGesture(pLassoInfo, 2, false);

if (*pHitResult != lassoNone) {
                                //
                                //      Get the lasso, and dispose of the other stuff
                                //
                                GetLassoSelection(pLassoInfo, phSelStroke);
                        }
                }
                else {
                        //
                        //      Pass on the lasso and the tap...
                        //
                        LassoPassOnStrokes(pLassoInfo, 2);
                }
                break;
```

```
            case lassoGesture:
                    //
                    //      Accumulating a lasso gesture.
                    //
                    if (!StrokeHitsLasso(pLassoInfo, hCurStroke) ||
                            pLassoInfo->strokesProcessed >= maxLassoStrokes) {

//
                            //      Pass on the lasso
                            //
                            LassoPassOnStrokes(pLassoInfo, 1);
                    }
                    else {

//
                            //      Simply increment the stroke count here, because unless
                            //      the user "times-out," I don't want to even think
                            //      about translating.
                            //
                            pLassoInfo->strokesProcessed++;

}
                    break;

default:

//
                    //      This shouldn't happen
                    //
                    Dbg(Debugf("Bad case in LassoCheckNewStroke"));
                    break;

}

//
    //      If there are no more strokes to try, then don't retry.  Furthermore,
    //              don't retry if I find a lasso anything.
    //

ASSERT(pLassoInfo->strokesProcessed <= pLassoInfo->lassoBuffer.uItemCount,
            "Bad # of processed strokes!");

if (pLassoInfo->lassoBuffer.uItemCount == pLassoInfo->strokesProcessed ||
            *pHitResult != lassoNoLasso) {
            retry = false;
    } return retry;
}       /*      end of LassoCheckNewStroke()    */

/***************************************************************************

LassoCheckTimeout
            Call this when a timeout gets sent to Fred for processing.

This is also a reasonably complicated routine.  Checks for a lasso
    based on the current state.  No matter what happens, this routine
    leaves me in a state of lassoNoLasso, with the lasso buffer cleared
    out.
```

```
                returns:

*****************************************************************************/
        LASSO_TYPES
 5      LassoCheckTimeout(
                H_LASSO_INFO            hLassoInfo,
                PH_UNPACKED_STROKE      phSelStroke)
        {
                P_LASSO_INFO            pLassoInfo;
10              LASSO_TYPES                     hitResult;

//      Clear the return value immediately
                *phSelStroke = hNull;
15              hitResult = lassoNoLasso;

//
                //      Lock the lasso information down.
                //
20              pLassoInfo = FakeMemLock(hLassoInfo);

switch (pLassoInfo->lassoState) {
                        case lassoNoLasso:
                                //
25                              //      This means that I don't even have a lasso in the buffer,
                                //              so I can do absolutely nothing here.
                                break;

case lassoPending:
30                              //
                                //      Empty out the lassoBuffer, and pretend that nothing happened.
                                //
                                LassoPassOnStrokes(pLassoInfo, pLassoInfo->lassoBuffer.uItemCount);
                                break;
35
                        case lassoTapPending:
                                //
                                //      The lasso tap should be recognized as the selection.
                                //
40
                                //
                                //      Check for just a lasso tap
                                //
                                if (pLassoInfo->lassoBuffer.uItemCount == 2) {
45                                      hitResult = lassoOnly;
                                }
                                else {
                                        hitResult = CheckForGesture(pLassoInfo, 2, true);
                                }
50
                                if (hitResult != lassoNone) {

GetLassoSelection(pLassoInfo, phSelStroke);
                                }
55                              else {
                                        //
                                        //      I didn't get a gesture that I recognized, so pass these
                                        //              strokes along.  It might be preferable to throw these
                                        //      strokes away, but we'll see.
60                                      //
                                        LassoPassOnStrokes(pLassoInfo,
                                                pLassoInfo->lassoBuffer.uItemCount);
                                }
```

```
                                break;

case lassoGesture:
                                //
                                //      If I have collected a valid gesture, then do something.
                                //
                                hitResult = CheckForGesture(pLassoInfo, 1, true);

if (hitResult != lassoNone) {
                                        //
                                        //      If I have a gesture, then take it.
                                        //
                                        GetLassoSelection(pLassoInfo, phSelStroke);
                                }
                                else {
                                        //
                                        //      I didn't get a valid gesture, so pass on all the strokes
                                        //      that I have collected.
                                        //
                                        LassoPassOnStrokes(pLassoInfo,
                                                pLassoInfo->lassoBuffer.uItemCount);
                                } break;

}

//
                //      No matter what, the new state must be that there is no lasso
                //              pending.
                //
                pLassoInfo->lassoState = lassoNoLasso;

FakeMemUnlock(hLassoInfo);

return hitResult;
        }       /*      end of LassoCheckTimeout()       */

/*************************************************************************

LassoClearBuffer
                When the user does something which unambiguously determines that
        the contents of the current scribble buffer are invalid, then this routine
        empties the current scribble buffer for normal processing.

For the moment, this is only called on a penHoldTimeout.

returns:

*************************************************************************/
VOID
LassoClearBuffer(
        H_UNKNOWN               hLassoInfo)
{
        P_LASSO_INFO    pLassoInfo;

pLassoInfo = FakeMemLock(hLassoInfo);

LassoPassOnStrokes(pLassoInfo, pLassoInfo->lassoBuffer.uItemCount);
```

```
            FakeMemUnlock(hLassoInfo);

}       /*      end of LassoClearBuffer()       */

/***************************************************************************

LassoPassOnStrokes
                This routine passes on a given # of strokes from the hLassoScribble
        buffer to the normal ink buffer routines.  Unfortunately, this currently
        does not update the bounds of the lassoScribble, but I do not use that
        information anyway.

params:
                pData:                          fred instance data
                uStrokeCount:           count of strokes to pass on.

***************************************************************************/
void
LassoPassOnStrokes(
        P_LASSO_INFO            pLassoInfo,
        U16                                     uStrokeCount)
{
        H_UNPACKED_STROKE       hStroke;
        U16                                     i;

ASSERT(uStrokeCount <= pLassoInfo->lassoBuffer.uItemCount,
                "Attempting to remove too many strokes in LassoPassOnStrokes");

for (i = 0 ; i < uStrokeCount ; i++) {

//
                //      Remove the item from the beginning of the lasso buffer.
                //
                LLBuffRemoveItem(&pLassoInfo->lassoBuffer, 0, &hStroke);

//
                //      And add it at the END of the regular buffer.
                //
                LLBuffAppendItem(&pLassoInfo->regularBuffer, hStroke);
        } pLassoInfo->lassoState = lassoNoLasso;
        pLassoInfo->strokesProcessed = 0;

}       /*      end of LassoPassOnStrokes()     */

/***************************************************************************

IsALasso
                returns TRUE if the first stroke in the Lasso buffer is in fact
        something reasonably approximating a LASSO.

***************************************************************************/
BOOLEAN
IsALasso(
        P_LASSO_INFO            pLassoInfo,
        H_UNPACKED_STROKE       hStroke)
{
        BOOLEAN                         isLasso;
        P_UNPACKED_STROKE       pStroke;
```

```
        RECT32              rTwipsBounds;
        P_XY32              pFirstPt;           //    first and last points of the
  stroke
        P_XY32              pLastPt;
        XY32                xyTwipsDist;
        S32                    endDistMax;     //  .     maximum dist between
  endpts allowed.
        S32                    delta;
        U32                    endDist;
        U32                    newEndDist;
        U16                    checkPtLimit;
        U16                    checkPtCount;

//
        //      Assume that I have not found a lasso yet.
        //
        isLasso = false;
        pStroke = FakeMemLock(hStroke);

//
        //      First, check that the stroke is large enough to be considered a
        //      lasso.
        //
        FredScaleRect(pLassoInfo->penToTwips, &pStroke->rStrokeBound, &rTwipsBounds);

if (rTwipsBounds.size.w < lassoStrokeMinSize ||
                rTwipsBounds.size.h < lassoStrokeMinSize) { goto fail;

}

//
        //      Now, check whether the end points are at all near each other
        //
        pFirstPt = pStroke->points;
        //      This intentionally starts one too high.
        pLastPt = &pStroke->points[pStroke->uPointCount];

//
        //      As an interesting improvement, I am checking backwards to find the
        //      local minimum distance between a point just before the end and the
        //      start point.
        //
        newEndDist = maxS32;

checkPtCount = 0;
        checkPtLimit = pStroke->uPointCount / 8;

if (checkPtLimit > 1) {
                //
                //      If there is more than one point to check, then check it.
                //
                do {

//
                        //      I am throwing in a 10% factor here to eliminate the effects
                        //      of jitter.
                        //
                        endDist = newEndDist + (newEndDist / 10);

//
```

```
                //      Skip back a point.
                //
                pLastPt--;
                checkPtCount++;

//
                //      Get the square of the distance between the two points
                //
                delta = pLastPt->x - pFirstPt->x;
                newEndDist = delta * delta;
                delta = pLastPt->y - pFirstPt->y;
                newEndDist += delta * delta;

} while ( (newEndDist < endDist) && (checkPtCount < checkPtLimit)) ;

//
        //      Since I found an increase, increment the last point by 1.
        //
        pLastPt++;
    }
    else {

//
        //      Else, only one point to check, so point to it.
        //
        pLastPt--;

}

//      Perform one of two checks.  If the size of the stroke is relatively
    //      small, then check for one threshhold of points difference, otherwise,
    //      check for a slightly larger point difference.
    //
    xyTwipsDist.x = pLastPt->x - pFirstPt->x;
    xyTwipsDist.y = pLastPt->y - pFirstPt->y;
    FredScalePt(pLassoInfo->penToTwips, &xyTwipsDist, &xyTwipsDist);

if (rTwipsBounds.size.w < strokeThreshholdSize &&
            rTwipsBounds.size.h < strokeThreshholdSize) {

//
            //      This is a small lasso, so use a small threshhold for how close
            //      the end points must be.
            //
            endDistMax = smallStrokeMaxEndDist;

}
    else {

//
            //      A large lasso, so let the user be a little looser.
            //
            endDistMax = largeStrokeMaxEndDist;
    } if (Abs(xyTwipsDist.x) > endDistMax || Abs(xyTwipsDist.y) > endDistMax) { goto fail;
    }

//
    //      I have found a lasso!
    //
```

```
                isLasso = true;

fail:
                FakeMemUnlock(hStroke);

return isLasso;
        }       /*      end of IsALasso()        */

/**************************************************************************

IsATapInLasso
                Determines whether the second stroke in the lasso buffer list is in
        fact a tap, and whether it lies within the lasso.

This routine assumes that it will get called when there is a

**************************************************************************/
BOOLEAN
IsATapInLasso(
        P_LASSO_INFO            pLassoInfo,
        H_UNPACKED_STROKE       hStroke)
{
        P_UNPACKED_STROKE       pStroke;
        BOOLEAN                 isATap;

//
        //      Assume that this is not a tap within a lasso.
        //
        isATap = false;

pStroke = FakeMemLock(hStroke);

if (IsATap(&pStroke->rStrokeBound, pLassoInfo->penToTwips)) {

//
                //      This is an acceptable sized tap, so now test that it actually
                //      lies within the lasso.
                //
                isATap = PtInLasso(pLassoInfo, &pStroke->rStrokeBound.origin);

}

FakeMemUnlock(hStroke);

return isATap;

}       /*      end of IsATapInLasso()  */

/**************************************************************************

PtInLasso
                Returns true if the point given lies within the lasso, which this
        routine assumes is the first stroke in the lasso buffer.

**************************************************************************/
BOOLEAN
PtInLasso(
        P_LASSO_INFO            pLassoInfo,
        P_XY32                  pCheckPt)
{
```

```
                P_UNPACKED_STROKE              pStroke;
                BOOLEAN                        hit;

5           pStroke = FakeMemLock(pLassoInfo->lassoBuffer.hFirstItem);

//
                //      For now, I am just doing a standard point in rectangle type thing.
                //
   10           hit = FredPointInPolygon(pCheckPt, &pStroke->rStrokeBound,
                        pStroke->points, pStroke->uPointCount);

FakeMemUnlock(pLassoInfo->lassoBuffer.hFirstItem);

15           return hit;
            )   /*      end of PtInLasso()          */

/*****************************************************************
   20
                StrokeHitsLasso
                        This routine determines whether the stroke in fact hits the lasso
                The test here is merely a touching test, whether or not it enclosing.

25   *****************************************************************/
        BOOLEAN
        StrokeHitsLasso(
                P_LASSO_INFO                   pLassoInfo,
                H_UNPACKED_STROKE              hTestStroke)
   30   {
                P_UNPACKED_STROKE              pStroke;
                P_UNPACKED_STROKE              pLassoStroke;
                BOOLEAN                        hits;

35
                pStroke = FakeMemLock(hTestStroke);

//
                //      Get the lasso stroke
   40           //
                pLassoStroke = FakeMemLock(pLassoInfo->lassoBuffer.hFirstItem);

hits = Rect32sIntersect(&pStroke->rStrokeBound, &pLassoStroke->rStrokeBound);

45           //
                //      Unlock and return
                //
                FakeMemUnlock(pLassoInfo->lassoBuffer.hFirstItem);
                FakeMemUnlock(hTestStroke);
   50 return hits;
            )   /*      end of StrokeHitsLasso()         */

55
        /*****************************************************************

GetCurrentStroke
                        Returns the current stroke, that is, the stroke indicated by
   60           the strokesProcessed field of the lasso state structure.

*****************************************************************/
        H_UNPACKED_STROKE
```

```
        GetCurrentStroke(
                P_LASSO_INFO           pLassoInfo)
        {
                H_UNPACKED_STROKE      hStroke;
 5

//
                //      Snag the item from the buffer.
                //
10              LLBuffGetItem(&pLassoInfo->lassoBuffer, pLassoInfo->strokesProcessed,
                        &hStroke);

return hStroke;
        }       /*      end of GetCurrentStroke()      */
15

/*************************************************************

CheckForGesture
20              In order to determine whether the current set of strokes indicates
        some kind of selection with a gesture, some routine needs to do some
        translating.  So this does the translation, and decides whether the gesture
        is unambiguous.

25      If the gesture is unambiguous, then this returns a hit result.
        returns:

*************************************************************/
        LASSO_TYPES
30      CheckForGesture(
                P_LASSO_INFO           pLassoInfo,
                U16                                    skipStrokes,
                BOOLEAN                                hasTimeout)
        {
35              STATUS                 s;
                UK_SYS_SCRIBBLE        ukSysScribble;
                LASSO_TYPES            hitResult;
                RECT32                          rScribbleBounds;       //      temporary bounds of strokes
                H_UNPACKED_STROKE      hStroke;
40              P_UNPACKED_STROKE      pStroke;
                H_FI_GEST_INFO         hGestInfo;
                P_FI_GEST_INFO         pGestInfo;
                XY32                            hotPoint;
                U16                             i;
45 hitResult = lassoNone;
                s = StsWarn(FIMakeSysScribble(&ukSysScribble));
                if (s != stsOK)
50                      goto fail;

//
                //      Zero out the bounds of the "scribble"
                //
55              rScribbleBounds.size.w = rScribbleBounds.size.h = -1;
                for (i = skipStrokes ; i < pLassoInfo->strokesProcessed ; i++) {

LLBuffGetItem(&pLassoInfo->lassoBuffer, i, &hStroke);

60                      pStroke = FakeMemLock(hStroke);

//
                        //      Build up a union bounds of the strokes
```

```
              //
              Rect32Union(&pStroke->rStrokeBound, &rScribbleBounds,
                    &rScribbleBounds);

FIAddToSysScribble(ukSysScribble, pStroke->linkSysStroke);

FakeMemUnlock(hStroke);
          }

//
          //    Perform the translation
          //
          FITranslate(ukSysScribble, frTranslateGesture, pNull, &hGestInfo);

//
          //    And free the scribble.
          //
          FIFreeSysScribble(ukSysScribble);

//
          //    Now check the translation results
          //
          pGestInfo = FakeMemLock(hGestInfo);

//
          //    If I have the maximum # of strokes that can be in a gesture, then
          //    I will accept this gesture translation as valid.
          //
          if (hasTimeout ||
                pLassoInfo->strokesProcessed - skipStrokes >= maxGestureStrokes) {

//
                //    Check to see if this gesture translates as I want it to.
                //
                switch (pGestInfo->gestCode) {
                      case fiGestCrossOut:
                            hitResult = lassoCrossOut;
                            break;

case fiGestFlickUp:
                            hitResult = lassoUpFlick;
                            break;

case fiGestIndex:
                            hitResult = lassoIndex;

} if (hitResult != lassoNone) {
                      //
                      //    Now, check that the hot point of the gesture targets to the
                      //    lasso.
                      // hotPoint.x = pGestInfo->hotPoint.x + rScribbleBounds.origin.x;
                      hotPoint.y = pGestInfo->hotPoint.y + rScribbleBounds.origin.y;

if (!PtInLasso(pLassoInfo, &hotPoint)) {
                            hitResult = lassoNone;
                      }

}
```

```
                }

FakeMemUnlock(hGestInfo);
                FakeMemFree(hGestInfo);
        fail:

return hitResult;
        }       /*      end of CheckForGesture()        */

/*******************************************************************************

GetLassoSelection
                When I discover that I have a lasso, I need to get the lasso and
                dispose of all the other strokes that I have so carefully collected in
                my buffer.  This is the routine that does that.

*******************************************************************************/
VOID
GetLassoSelection(
        P_LASSO_INFO            pLassoInfo,
        PH_UNPACKED_STROKE      phSelStroke)
{
        H_UNPACKED_STROKE       hStroke;
        P_UNPACKED_STROKE       pStroke;
        RECT32                          rDirtyRect;

//
        //      Remove the first stroke, the lasso, from the buffer of strokes
        //
        LLBuffRemoveItem(&pLassoInfo->lassoBuffer, 0, phSelStroke);

//
        //      Loops through the strokes in a scribble, removing them 1 by 1.
        //
        while (pLassoInfo->lassoBuffer.hFirstItem != hNull) {

//
                //      Remove the first item from the list
                //
                LLBuffRemoveItem(&pLassoInfo->lassoBuffer, 0, &hStroke);

pStroke = FakeMemLock(hStroke);

//
                //      For each stroke that I am throwing away, compute its bounds
                //      and invaldate this area.
                //

//
                //      Compute the area of the stroke I am disposing.
                //
                FredScaleRect(pLassoInfo->penToDevice, &pStroke->rStrokeBound, &rDirtyRect);

rDirtyRect.origin.x -= 1;
                rDirtyRect.origin.y -= 1;
                rDirtyRect.size.w += 2;
                rDirtyRect.size.h += 2;

//
                //      Dirty the area
                //
```

```
                FWDirtyRect(pLassoInfo->ukWin, &rDirtyRect);
                FakeMemUnlock(hStroke);

//
5               //      And dispose of the stroke, finally
                //
                FredFreeStroke(hStroke);
        }

10      //
        //      ALL DONE
        //
        pLassoInfo->lassoState = lassoNoLasso;
        pLassoInfo->strokesProcessed = 0;
15
    }   /*      end of GetLassoSelection()      */
```

We claim:

1. A method of selecting at least a portion of information displayed on a display as selected information and an operation to be performed upon said selected information through a stream of drawing input, said method comprising the steps of:

identifying within said stream of drawing input a first stroke that substantially encircles at least a part of said information and that is used either for selecting said at least a part of said information or for performing a drawing function other than selecting said at least a part of said information, wherein said first stroke comprises a plurality of points positioned along said first stroke between a start point, a next-to-the-last point, and an end point, and said first stroke has horizontal bounds and vertical bounds;

identifying within said stream of drawing input a second stroke that at least partially identifies a gesture and said operation to be selected; and identifying said at least a portion of said information as being selected as said selected information and said operation as being selected when at least one predetermined condition relating only said first stroke and said gesture has been satisfied.

2. The method of claim 1 wherein said first stroke can be recognized as a lasso.

3. The method of claim 1 further including the steps of:

determining a first distance between said start point and said end point of said first stroke;

determining a second distance between said start point and said next-to-the-last point;

determining a plurality of near-end distances between said start point and each of said plurality of points in said first stroke by working from a one of said plurality of points closest to said next-to-the-last point toward said start point until a local minimum is found, or until a specified number of said plurality of near-end distances have been determined;

comparing, from a set of distances including said first distance, said second distance, and said plurality of near-end distances, and from a set of points including said end point, said next-to-the-last point, and said plurality of points, one of said set of distances that corresponds to one of said set of points with two other of said set of distances that each correspond to a neighboring point located adjacent to said one of said set of points;

assigning said one of said set of distances as said local minimum when said one of said set of distances is less than said two other of said set of distances;

selecting a smallest distance from said set of distances as said local minimum when said assigning step fails to assign any of said one of said set of distances as said local minimum; and comparing said local minimum to a standard to determine whether said first stroke qualifies as a lasso.

4. The method of claim 3 wherein said assigning step assigns said one of said set of distances as said local minimum when said one of said set of distances is both less than one of said two other of said set of distances that is closest to said end point, and less than another of said two other of said set of distances plus a jitter factor.

5. The method of claim 4 wherein said jitter factor is defined as:

$$(((ND^2)*1.1)^{1/2})$$

wherein ND is said another of said two other of said set of distances.

6. The method of claim 3 wherein said specified number is ⅛ of a total number of points in said first stroke.

7. The method of claim 3 wherein said standard is based upon said horizontal bounds and said vertical bounds of said first stroke.

8. The method of claim 7 further including the steps of:

selecting as said standard, a first standard when both said horizontal bounds and said vertical bounds of said first stroke are separated by at most 24 typographical points; and selecting as said standard, a second standard when both said horizontal bounds and said vertical bounds of said first stroke are separated by more than 24 typographical points.

9. The method of claim 8 wherein said first standard requires that said local minimum have neither a horizontal nor vertical component greater than 5 typographical points.

10. The method of claim 8 wherein said second standard requires that said local minimum have neither a horizontal nor vertical component greater than 12 typographical points.

11. The method of claim 1 further including the step of:

identifying said first stroke as not selecting said at least a portion of said information as said selected information and as not selecting said operation in the absence of said second stroke.

12. The method of claim 1 further including the step of:

identifying said first stroke as not selecting said at least a portion of said information as said selected information and as not selecting said operation when said second stroke is not identified within said stream of drawing input within a specified period of time after the identification of said first stroke.

13. The method of claim 1 further including the step of:

identifying said first stroke and said second stroke as not selecting said at least a portion of said information as said selected information and as not selecting said operation when a subsequent action is taken and said subsequent action is unrelated to the selection of said operation.

14. The method of claim 1 further including the step of:

identifying said first stroke and said second stroke as not selecting said at least a portion of said information as said selected information and as not selecting said operation when a subsequent stroke is drawn within an interior portion of said first stroke.

15. The method of claim 1 wherein selecting said at least a portion of said information as said selected information and selecting said operation is completed when a drawing means is removed from a close proximity with a display means after said first stroke and said second stroke have been drawn.

16. The method of claim 1 wherein selecting said at least a portion of said information as said selected information and selecting said operation is completed when a subsequent stroke is drawn at least a predetermined distance away from said first stroke and said second stroke.

17. The method of claim 1 wherein selecting said at least a portion of said information as said selected information and selecting said operation is completed when there is an absence of at least one subsequent stroke within said stream of drawing input for at least a specified period of time.

18. The method of claim 1 wherein said operation is a deletion operation, said first stroke identifies said at least a part of said information as said at least a portion of said information that is to be deleted and said gesture invokes said deletion operation.

19. The method of claim 1 wherein said operation is an enlargement operation, said first stroke identifies said at least a part of said information as said at least a portion of said information that is to be enlarged and said gesture invokes said enlargement operation.

20. The method of claim 1 wherein said operation is a move operation, said first stroke identifies said at least a part of said information as said at least a portion of said information that is to be moved and said gesture invokes said move operation.

21. The method of claim 1 wherein said operation is a copy operation, said first stroke identifies said at least a part of said information as said at least a portion of said information that is to be copied and said gesture invokes said copy operation.

22. The method of claim 1 wherein said operation is an indexing operation, said first stroke identifies said at least a part of said information as an index segment within a document and said gesture invokes said indexing operation.

23. The method of claim 1 wherein said operation is a deletion operation, said first stroke identifies a part of said information other than said at least a part of said information as said at least a portion of said information that is to be deleted and said gesture invokes said deletion operation.

24. The method of claims 1 wherein said operation is an enlargement operation, said first stroke identifies a part of said information other than said at least a part of said information as said at least a portion of said information that is to be enlarged and said gesture invokes said enlargement operation.

25. The method of claim 1 wherein said operation is a move operation, said first stroke identifies a part of said information other than said at least a part of said information as said at least a portion of said information that is to be moved and said gesture invokes said move operation.

26. The method of claim 1 wherein said operation is a copy operation, said first stroke identifies a part of said information other than said at least a part of said information as said at least a portion of said information that is to be copied and said gesture invokes said copy operation.

27. The method of claim 1 wherein said operation is an indexing operation, said first stroke identifies a part of said information other than said at least a part of said information as said at least a portion of said information that is to be used as an index segment within a document and said gesture invokes said indexing operation.

28. A method of selecting at least a portion of information displayed on a display as selected information and an operation to be performed upon said selected information through a stream of drawing input, said method comprising the steps of:

identifying within said stream of drawing input a first stroke that substantially encircles at least a part of said information;

identifying with said stream of drawing input a second stroke;

identifying within said stream of drawing input a third stroke that at least partially identifies a gesture and said operation to be selected; and identifying said at least a portion of said information as being selected as said selected information when at least one predetermined condition relating only said first stroke and said second stroke has been satisfied, and said operation as being selected when at least one predetermined condition relating only said third stroke and at least one of said first stroke and said second stroke has been satisfied.

29. The method of claim 28 further including the step of:

identifying said operation as not being selected when said first stroke and at least one of said second stroke and said third stroke do not satisfy a predetermined spatial relationship.

30. The method of claim 28 wherein said operation is a deletion operation, said first stroke identifies said at least a part of said information as said at least a portion of said information that is to be deleted and said gesture invokes said deletion operation.

31. The method of claim 28 wherein said operation is an enlargement operation, said first stroke identifies said at least a part of said information as said at least a portion of said information that is to be enlarged and said gesture invokes said enlargement operation.

32. The method of claim 28 wherein said operation is a move operation, said first stroke identifies said at least a part of said information as said at least a portion of said information that is to be moved and said gesture invokes said move operation.

33. The method of claim 28 wherein said operation is a copy operation, said first stroke identifies said at least a part of said information as said at least a portion of said information that is to be copied and said gesture invokes said copy operation.

34. The method of claim 28 wherein said operation is an indexing operation, said first stroke identifies said at least a part of said information as said at least a portion of said information that is to be used as an index segment within a document and said gesture invokes said indexing operation.

35. The method of claim 28 wherein said operation is a deletion operation, said first stroke identifies a part of said information other than said at least a part of said information as said at least a portion of said information that is to be deleted and said gesture invokes said deletion operation.

36. The method of claim 28 wherein said operation is an enlargement operation, said first stroke identifies a part of said information other than said at least a part of said information as said at least a portion of said information that is to be enlarged and said gesture invokes said enlargement operation.

37. The method of claim 28 wherein said operation is a move operation, said first stroke identifies a part of said information other than said at least a part of said information as said at least a portion of said information that is to be moved and said gesture invokes said move operation.

38. The method of claim 28 wherein said operation is a copy operation, said first stroke identifies a part of said information other than said at least a part of said information as said at least a portion of said information that is to be copied and said gesture invokes said copy operation.

39. The method of claim 28 wherein said operation is an indexing operation, said first stroke identifies a part of said information other than said at least a part of said information as said at least a portion of said information that is to be used as an index segment within a document and said gesture invokes said indexing operation.

* * * * *

UNITED STATES PATENT AND TRADEMARK OFFICE
CERTIFICATE OF CORRECTION

PATENT NO. : 5,867,150

DATED : February 2, 1999

INVENTOR(S) : Daniel Bricklin et al.

It is certified that error appears in the above-identified patent and that said Letters Patent is hereby corrected as shown below:

```
Column 1,   line  6, change "07/833,589" to --07/833,859, filed--;
Column 1,   line 47, change "the the" to --the--;
Column 1,   line 54, change "a and" to --and a--;
Column 4,   line 13, change "dosed" to --closed--;
Column 7,   line 24, delete "." after "is";
Column 7,   line 28, change "dose" to --closed--;
Column 9,   line  5, change "dosed" to --closed--;
Column 9,   line  7, insert --the-- after "Additionally,";
Column 9,   line  9, change "dear" to --clear--;
Column 9,   line 39, change "taps." to --taps--;
Column 9,   line 43, delete "is";
Column 9,   line 44, change "dear" to --clear--;
Column 9,   line 53, change "dearly" to --clearly--;
Column 11,  line  6, change "systems" to --system--;
Column 12,  line 20, insert --,-- after "Of course";
Column 13,  line 15, change "when-the" to --when the--;
```

UNITED STATES PATENT AND TRADEMARK OFFICE
CERTIFICATE OF CORRECTION

PATENT NO. : 5,867,150

DATED : February 2, 1999

INVENTOR(S) : Daniel Bricklin et al.

It is certified that error appears in the above-identified patent and that said Letters Patent is hereby corrected as shown below:

```
Column 14, line 35, insert --be-- after "may";
Column 57, line 27, change "claims" to --claim--.
```

Signed and Sealed this

Tenth Day of April, 2001

Attest:

NICHOLAS P. GODICI

Attesting Officer

Acting Director of the United States Patent and Trademark Office